US012802905B2

(12) United States Patent
Nowakowski et al.

(10) Patent No.: US 12,802,905 B2
(45) Date of Patent: *Nov. 17, 2026

(54) SECURITY SYSTEM SENSOR AND METHODS

(71) Applicant: Comcast Cable Communications, LLC, Philadelphia, PA (US)

(72) Inventors: Tamara Nowakowski, Parker, CO (US); Marcus Spain, Parker, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 68 days.

This patent is subject to a terminal disclaimer.

(21) Appl. No.: 18/933,744

(22) Filed: Oct. 31, 2024

(65) Prior Publication Data

US 2025/0132107 A1 Apr. 24, 2025

Related U.S. Application Data

(63) Continuation of application No. 18/214,734, filed on Jun. 27, 2023, now Pat. No. 12,159,762, which is a continuation of application No. 17/517,456, filed on Nov. 2, 2021, now Pat. No. 11,728,107, which is a continuation of application No. 17/000,058, filed on Aug. 21, 2020, now Pat. No. 11,195,677, which is a continuation of application No. 16/362,279, filed on Mar. 22, 2019, now Pat. No. 10,790,103.

(51) Int. Cl.
*G08B 13/08* (2006.01)
*H01H 13/18* (2006.01)

(52) U.S. Cl.
CPC ........... *H01H 13/183* (2013.01); *G08B 13/08* (2013.01)

(58) Field of Classification Search
None
See application file for complete search history.

(56) References Cited

U.S. PATENT DOCUMENTS 3,790,944 A * 2/1974 Yarwood ................ G08B 13/08 340/545.9
4,194,193 A 3/1980 McDonough
5,872,514 A 2/1999 Neas
9,860,965 B2 1/2018 Recker et al.
11,728,107 B2 * 8/2023 Nowakowski ......... G08B 13/08 340/541

(Continued)

OTHER PUBLICATIONS

U.S. Appl. No. 18/214,734, (2024/0105403), filed Jun. 27, 2023 (Mar. 28, 2024), Tamara Nowakowski (Comcast Cable Communications, LLC).

(Continued)

*Primary Examiner* — John F Mortell
(74) *Attorney, Agent, or Firm* — Ballard Spahr LLP

(57) ABSTRACT

A three-way switch associated with an entry point barrier may provide a security system with information regarding a position of the entry point barrier as it moves along a path of travel. As the entry point barrier moves, the three-way switch may come into proximity with an external object, and the three-way switch may indicate to the security system that a circuit associated with the three-way switch has been closed. The security system may determine that the entry point barrier is in a given position, and one or more security system policies associated with the given position may be activated.

28 Claims, 19 Drawing Sheets

(56) References Cited

U.S. PATENT DOCUMENTS

| | | | | |
|---|---|---|---|---|
| 2013/0091768 | A1 | 4/2013 | Houser et al. | |
| 2022/0199336 | A1* | 6/2022 | Nowakowski ....... | H01H 13/183 |

OTHER PUBLICATIONS

U.S. Appl. No. 17/517,456 (11,728,107), filed Nov. 2, 2021 (Aug. 15, 2023), Tamara Nowakowski (Comcast Cable Communications, LLC).
U.S. Appl. No. 17/000,058 (11,195,677), filed Aug. 21, 2020 (Dec. 7, 2021), Tamara Nowakowski (Comcast Cable Communications, LLC).
U.S. Appl. No. 16/362,279 (10,790,103), filed Mar. 22, 2019 (Sep. 29, 2020), Tamara Nowakowski (Comcast Cable Communications, LLC).

* cited by examiner

100

SECURITY SYSTEM SENSOR AND METHODS

CROSS REFERENCE TO RELATED PATENT APPLICATIONS

This application claims priority under 35 U.S.C. § 120 to, and is a continuation of, U.S. patent application Ser. No. 18/214,734, filed Jun. 27, 2023, which claims priority under 35 U.S.C. § 120 to, and is a continuation of, U.S. patent application Ser. No. 17/517,456, filed Nov. 2, 2021, now U.S. Pat. No. 11,728,107, which claims priority under 35 U.S.C. § 120 to, and is a continuation of, U.S. patent application Ser. No. 17/000,058, filed Aug. 21, 2020, now U.S. Pat. No. 11,195,677, which claims priority under 35 U.S.C. § 120 to, and is a continuation of, U.S. patent application Ser. No. 16/362,279, filed Mar. 22, 2019, now U.S. Pat. No. 10,790,103, the entire contents of each of which are hereby incorporated herein by reference in its entirety for all purposes.

BACKGROUND

Security systems are used across the world to protect homes and businesses. Most security systems include sensors installed at entry points and security system policies may be enforced based on a respective status of each sensor. If a sensor indicates that an entry point barrier is open while the security system is not armed, security system policies may prevent a user from arming the system until the sensor indicates the entry point barrier is closed. If a sensor indicates that an entry point barrier is caused to be opened while the security system is armed, the security system policies may cause an alarm to be triggered, a nearby surveillance camera to record video, emergency personnel to be called, etc. Existing sensors used by security systems are binary in nature-indicating that either an associated entry point is open or is closed. This drawback of existing sensors prevents the security system from determining whether an entry point barrier is simply ajar rather than fully opened.

SUMMARY

It is to be understood that both the following general description and the following detailed description are exemplary and explanatory only and are not restrictive. Provided are security system sensor configurations and methods of using the same to implement security systems and associated policies. In order to maintain a high level of security while providing convenience to users, the security system may use one or more multi-position and multi-functionality sensors, such as three-way sensors (e.g., three-way switches), rather than one-way sensors (e.g., one-way switch), installed at one or more entry point barriers. A three-way switch may have a moveable member enclosed within that may be caused to move along a path of travel parallel to a top and a bottom of the three-way switch when an external object proximate to the three-way switch acts upon the moveable member. The three-way switch may be affixed to a planar surface of the entry point barrier, such as a window, a sliding door, and the like. A first external object, such as a bar magnet, may be affixed to a planar surface of a frame of the entry point barrier, such as a window frame, a door frame, and the like. As the entry point barrier moves along a path of travel within the entry point barrier frame, the three-way switch may come into proximity with the first external object, which may act upon the moveable member and cause it to be attracted to the external object. The moveable member may move along the path of travel within the three-way switch until it comes into contact with a conductive interface affixed to a first side of the three-way switch (e.g., a side of the three-way switch adjacent to the external object). As a result, the three-way switch may indicate to the security system that a circuit associated with the conductive interface affixed to the first side of the three-way switch has been closed. The security system may then determine that the entry point barrier is in a closed position, and one or more security system policies may be triggered.

As the entry point barrier moves in a direction along the path of travel within the entry point barrier frame approaching a point where the entry point barrier would be fully opened, the moveable member may be caused to return to the neutral position at a neutral point along the path of travel within the entry point barrier frame. The neutral point may correspond to a point along the path of travel within the entry point barrier frame that is past the first external object and prior to a further point along the path of travel within the entry point barrier frame at which a second external object may be affixed. At the neutral position, the three-way switch may be sufficiently between each of the first external object and the second external object such that neither is acting upon the moveable member. As a result, the moveable member may not be in contact with either the conductive interface affixed to the first side of the three-way switch or a conductive interface affixed to an opposite side of the three-way switch (e.g., a side of the three-way switch opposite to the first side). As a result, the three-way switch may indicate to the security system that the circuit associated with the conductive interface affixed to the first side of the three-way switch is open and a circuit associated with the conductive interface affixed to the opposite side of the three-way switch is also open. The security system may then determine that the entry point barrier is ajar, and one or more security system policies may be triggered.

As the entry point barrier moves past the neutral position in the direction along the path of travel within the entry point barrier frame approaching the point where the entry point barrier would be fully opened, the three-way switch may come into proximity with the second external object, such as a bar magnet, affixed to the planar surface of the frame of the entry point barrier. The second external object may act upon the moveable member and cause it to be repelled by the second external object. The moveable member may then move along the path of travel within the three-way switch until it comes into contact with the conductive interface affixed to the opposite side of the three-way switch. As a result, the three-way switch may indicate to the security system that the circuit associated with the conductive interface affixed to the opposite side of the three-way switch is closed. The security system may then determine that the entry point barrier is fully opened, and one or more security system policies may be triggered.

While the above sections describe using a single three-way switch and two external objects, it is to be understood that various configurations may be implemented to achieve the same end. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the security system sensors and methods of using the same described herein.

DETAILED DESCRIPTION

Figure 1A:
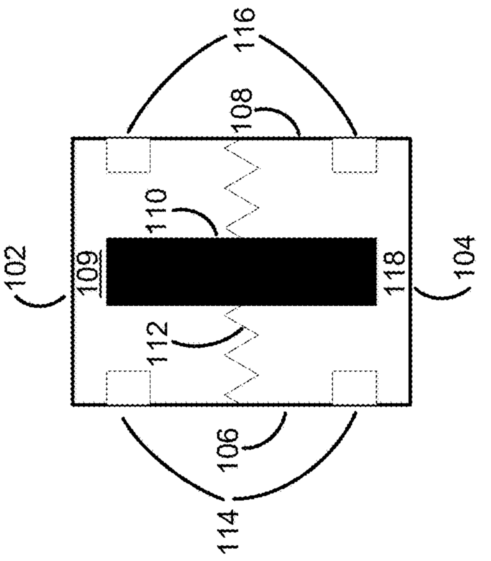
FIG. 1A shows a block diagram of an exemplary device in a first position.

Before the present security system sensors and methods are described, it is to be understood that the implementing security system policies using the described security system sensors are not limited to specific methods, specific components, or to particular implementations. It is also to be understood that the terminology used herein is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another range includes from the one particular value and/or to the other particular value. Similarly, when values are expressed as approximations, by use of the antecedent "about," it will be understood that the particular value forms another value or range. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not. Throughout the description and claims of this specification, the word "comprise" and variations of the word, such as "comprising" and "comprises," means "including but not limited to," and is not intended to exclude other components, integers or steps. "Such as" is not used in a restrictive sense, but for explanatory purposes.

Described herein are components that may be used to perform the described methods and systems. These and other components are described herein, and it is understood that when combinations, subsets, interactions, groups, etc. of these components are described that while specific reference of each various individual and collective combinations and permutations of these may not be explicitly described, each is specifically contemplated and described herein, for all methods and systems. This applies to all parts of this application including, but not limited to, steps in described methods. Thus, if there are a variety of additional steps that may be performed, it is understood that each of these additional steps may be performed with any combination or permutation of the described methods.

The present methods and systems may be understood more readily by reference to the following detailed description and to the Figures and their previous and following description. The methods and systems may be entirely hardware, entirely software, or a combination of software and hardware. The methods and systems may take the form of a computer program product on a computer-readable storage medium having computer-readable program instructions (e.g., computer software) embodied in the storage medium. The present methods and systems may take the form of web-implemented computer software. Any suitable computer-readable storage medium may be utilized including hard disks, CD-ROMs, optical storage devices, or magnetic storage devices.

The methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. Each block of the block diagrams and flowcharts, and combinations of blocks in the block diagrams and flowcharts, may be implemented by special purpose hardware-based computer systems that perform the specified functions or steps, or combinations of special purpose hardware and computer instructions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In order to maintain a high level of security while providing convenience to users, a security system may use one or more security system sensors as described herein installed at one or more entry points (e.g., a window, a door, a gate, or the like). Rather than using one-way sensors that are binary in nature, the security system sensors described herein may comprise a three-way switch. The three-way switch may have a moveable member enclosed within that may be caused to move along a path of travel parallel to a top and a bottom of the three-way switch when an external object proximate to the three-way switch acts upon the moveable member. The three-way switch may indicate a position of an entry point barrier based on a current position of the moveable member.

FIG. 1A shows a device 100 (e.g., a three-way switch) with a longitudinal member 110 (e.g., a magnetic element) in a neutral position. The device 100 may have a longitudinal top 102 situated parallel to a longitudinal bottom 104, a first longitudinal side 106 (e.g., a left side) situated parallel to a second longitudinal side 108 (e.g., a right side), and a longitudinal rear 109 (e.g., an interior wall) affixed and perpendicular to each of the longitudinal top 102, the longitudinal bottom 104, the first longitudinal side 106, and the second longitudinal side 108. A longitudinal space 118 (e.g., an interior space of a housing) may be formed by the first longitudinal side 104 and the second longitudinal side 106 each being joined to the longitudinal top 102, the longitudinal bottom 104, and the longitudinal rear 109.

The longitudinal member 110 (e.g., a moveable member) may be disposed within the longitudinal space 118 and situated parallel to each of the first longitudinal side 106 and the second longitudinal side 108 at a position corresponding to a midpoint of the longitudinal top 102 and a midpoint of the longitudinal bottom 104. The longitudinal member 110 may be held in the neutral position by a left suspension element 112 (e.g., a spring) and a right suspension element 110 (e.g., a spring). The longitudinal member 110 may be configured to move within the longitudinal space 118 along a path of travel parallel to the longitudinal top 102 and to the longitudinal bottom 104 between opposed first and second conductive interfaces (e.g., electrically conductive contact points). The device 100 may have a first conductive interface 114 (e.g., a first conductive point(s)) disposed within the longitudinal space 118 (e.g., the housing) and proximate to the first longitudinal side 106. The device 100 may also have a second conductive interface 116 (e.g., a second conductive point(s)) disposed within the longitudinal space 118 and proximate to the second longitudinal side 108.

Figure 1B:
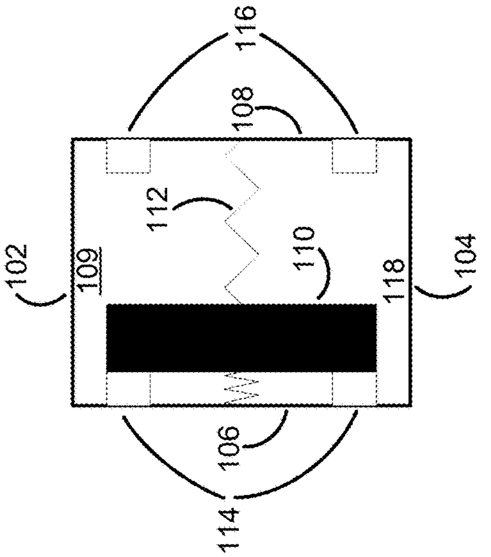
FIG. 1B shows a block diagram of the device in a second position.

FIG. 1B shows the device 100 with the longitudinal member 110 (e.g., the magnetic element) in a first conductive position and in contact with the first conductive interface 114. The longitudinal member 110 may be caused to move into the first conductive position by an external object sufficiently proximate to the device 100 (e.g., a bar magnet that attracts or repels the longitudinal member 110). The device 100 may be in communication with to a security system (e.g., wired or wireless) and configured to provide an indication that the longitudinal member 110 is in the first conductive position. The first conductive positon may indicate a first condition associated with the device 100, such as the longitudinal member 110 having been acted upon by an external force (e.g., a magnetic object) and caused to move in a first direction (e.g., toward the magnetic object).

Figure 1C:
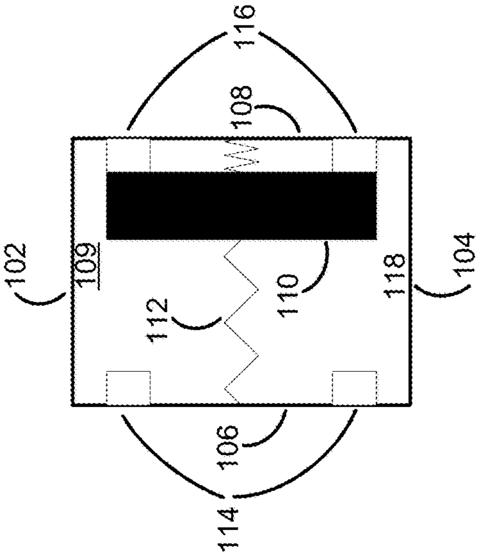
FIG. 1C shows a block diagram of the device in a third position.

FIG. 1C shows the device 100 with the longitudinal member 110 in a second conductive position and in contact with the second conductive interface 116. The longitudinal member 110 may be caused to move into the second conductive position by an external object sufficiently proximate to the device 100 (e.g., a bar magnet that attracts or repels the longitudinal member 110). The device 100 may be further configured to provide an indication that the longitudinal member 110 is in the second conductive position when the longitudinal member 110 comes into contact with the second conductive interface 116. The second conductive position may be indicative of the longitudinal member 110 having been acted upon by an external force (e.g., a magnetic object) and caused to move in a second direction (e.g., away from the magnetic object).

Figure 2A:
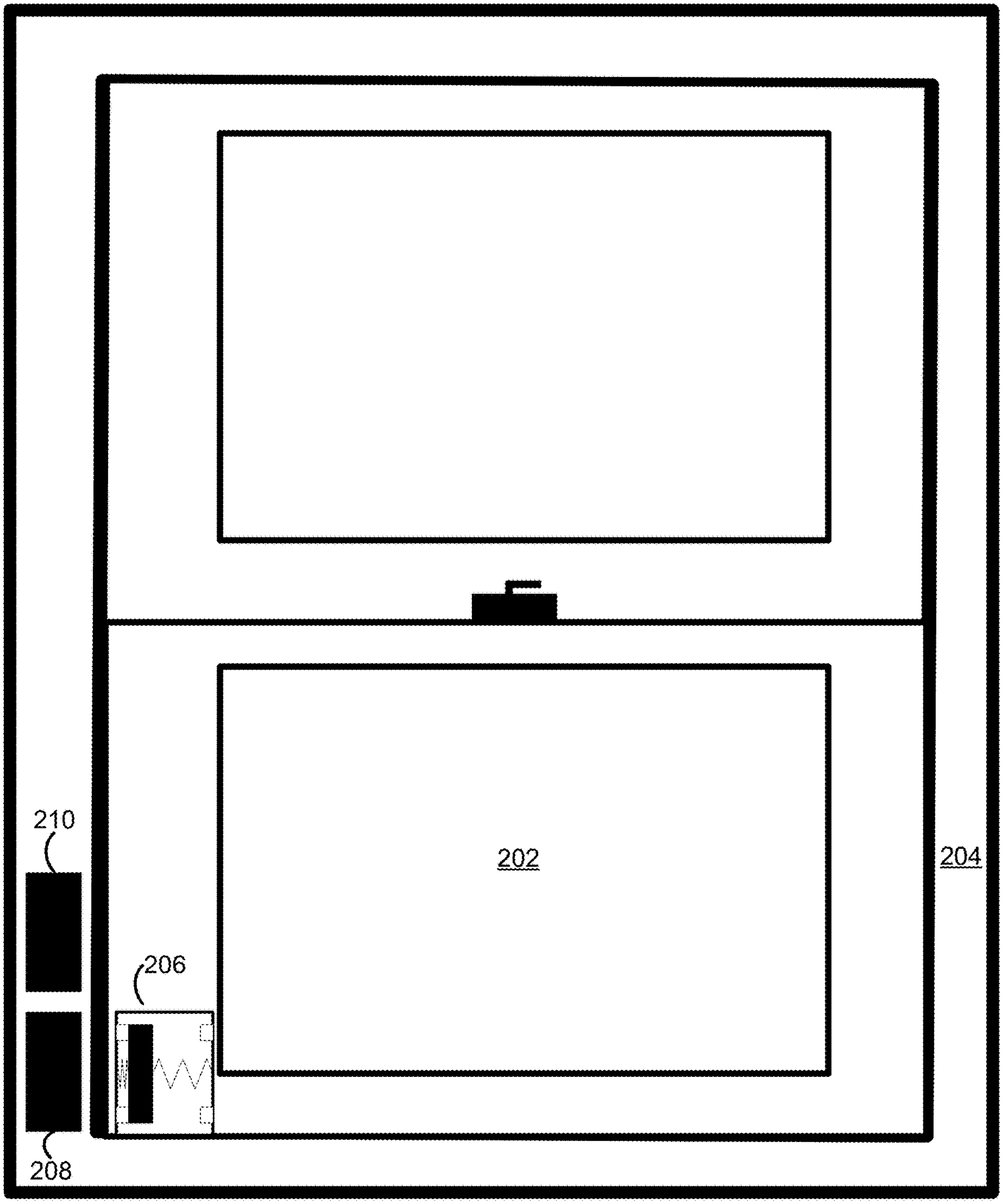
FIG. 2A shows an exemplary entry point barrier in a first position.

FIG. 2A shows an entry point barrier 202 (e.g., a window) situated within an entry point barrier frame 204 (e.g., a window frame) in a closed position. A three-way switch 206, such as the device 100, may be affixed to a planar surface of the entry point barrier 202. A first object 208 (e.g., a magnetic element) may be affixed to a planar surface of the entry point barrier frame 204 at a first position along a direction of travel of the entry point barrier 202, and a second object 210 (e.g., a magnetic element) may be affixed to a planar surface of the entry point barrier frame 204 at a second position along the direction of travel of the entry point barrier 202 The first object 208 and the second object 210 may each include a bar magnet. The bar magnet of the first object 208 may have a first polarity, and the bar magnet of the second object 210 may have an opposite, second polarity. The three-way switch 206 may have a moveable member (e.g., longitudinal member 110) enclosed within that may be caused to move along a path of travel parallel to a top and a bottom of the three-way switch 206 when the first object 208 is proximate to the three-way switch acts upon the moveable member.

When the entry point barrier 202 is in the closed position shown in FIG. 2A, the first object 208 may cause the moveable member of the three-way switch 206 to be attracted to the first object 208 (e.g., the moveable member of the three-way switch 206 may have a polarity that is opposite of the polarity of the first object 208). The moveable member may then move along the path of travel within the three-way switch 206 until it comes into contact with a conductive interface (e.g., the first conductive interface 114) affixed to a first side of the three-way switch 206 (e.g., a side of the three-way switch adjacent to the first object 208). The three-way switch 206 may be in communication with a security system (e.g., wired or wireless) and configured to provide an indication when the moveable member is in contact with the conductive interface affixed to the first side of the three-way switch 206 (e.g., indicating to the security system that a circuit associated with the conductive interface affixed to the first side of the three-way switch 206 has been closed).

Figure 2B:
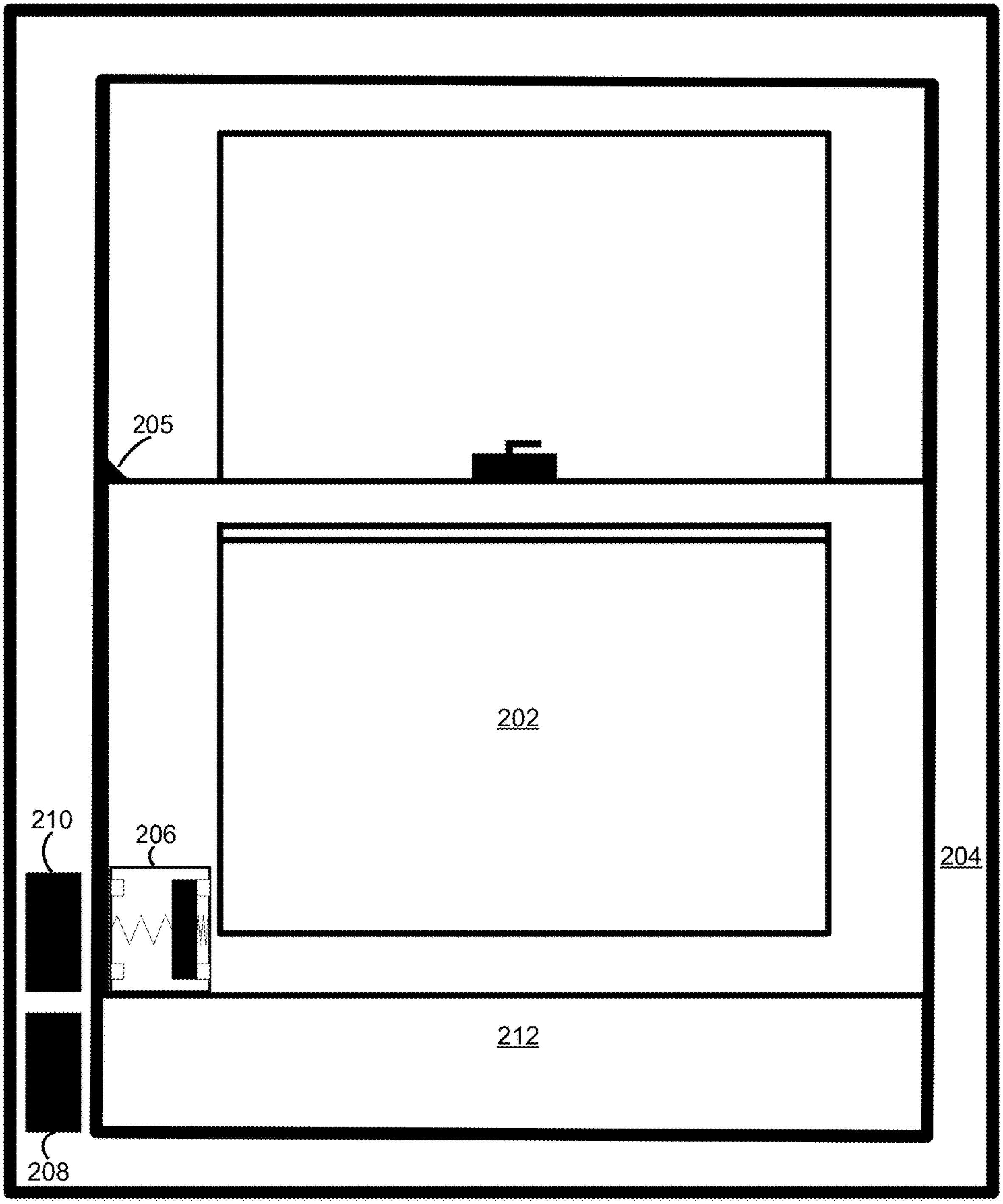
FIG. 2B shows the entry point barrier in a second position.

The first object may 208 also be an electronic device, such as a Bluetooth™ sensor, Radio Frequency Identification ("RFID") sensor, or the like. The first object 208 may detect a presence of the three-way switch 206 and/or the moveable member when it comes into proximity. The first object 208 may then indicate to the security system that the three-way switch 206 and/or the moveable member is proximate. The security system may determine that the entry point barrier 202 is in the closed position shown in FIG. 2A based on the three-way switch indicating that the circuit associated with the conductive interface affixed to the first side of the three-way switch 206 has been closed. The security system may determine that the entry point barrier 202 is in the closed position shown in FIG. 2A based on the first object 208 (e.g., an electronic device) indicating that the three-way switch 206 and/or the moveable member is proximate. Based on (e.g., in response to) determining that the entry point barrier 202 is in the closed position, the security system may cause one or more security system policies may be triggered. The one or more security system policies may include one or more of: causing a notification indicating that an entry point barrier is closed to be provided to a user device; causing a sound, such as beep, chime, bell, etc., to be emitted at one or more of the user device, a security system panel, or the like; an alarm to sound if a control unit of the security system determines an entry point barrier has moved into a fully opened position; causing a surveillance camera having a frame of view encompassing a full, or partial, view of an entry point barrier to begin, or to cease, recording; setting a status of the security system to a ready-to-arm status; causing a notification indicating that an entry point barrier is fully open to be provided to a user device; causing a sound, such as beep, chime, bell, etc., to be emitted at one or more of the user device, a security system panel, or the like; causing an audible alert/alarm to be output by a speaker in communication with the security system; setting a status of the security system to a not-ready-to-arm (e.g., a fault associated with an entry point barrier that cannot be bypassed is present); causing the security system (e.g., via a control unit) to notify law enforcement (e.g., by communicating with law enforcement via WiFi, cellular, and/or telephone); and the like FIG. 2B shows the entry point barrier 202 situated within the entry point barrier frame 204 in an ajar position, thereby creating an opening 212. The ajar position may correspond to a point on the entry point barrier frame 204 at which a secondary entry point lock 205 is located. As the entry point barrier 202 moves into the ajar position shown in FIG. 2B, the moveable member of the three-way switch 206 may come into proximity with the second object 210, which may act upon the moveable member and cause it to be repelled by the second object 210 (e.g., the polarity of the moveable member of the three-way switch 206 is the same as the polarity of the second object 210). The moveable member may then move along the path of travel within the three-way switch 206 until it comes into contact with a conductive interface affixed to the opposite side of the three-way switch 206. As a result, the three-way switch 206 may indicate to the security system that the circuit associated with the conductive interface affixed to the opposite side of the three-way switch 206 is closed.

The second object 210 may be an electronic device, such as a Bluetooth™ sensor, RFID sensor, or the like. The second object 210 may detect a presence of the three-way switch 206 and/or the moveable member when it comes into proximity (e.g., via Bluetooth™, RFID, or the like). When the second object 210 detects a presence of the moveable member, it may indicate to the security system that the three-way switch 206 and/or the moveable member is proximate t. The security system may determine that the entry point barrier 202 is in the ajar position shown in FIG. 2B based on the three-way switch 206 indicating that the circuit associated with the conductive interface affixed to the opposite side of the three-way switch 206 is closed. The security system may determine that the entry point barrier 202 is in the ajar position shown in FIG. 2B based on the second object 210 indicating that the three-way switch and/or the moveable member is proximate to it. Based on (e.g., in response to) determining that the entry point barrier 202 is in the ajar position, the security system may cause one or more security system policies may be triggered.

Figure 2C:
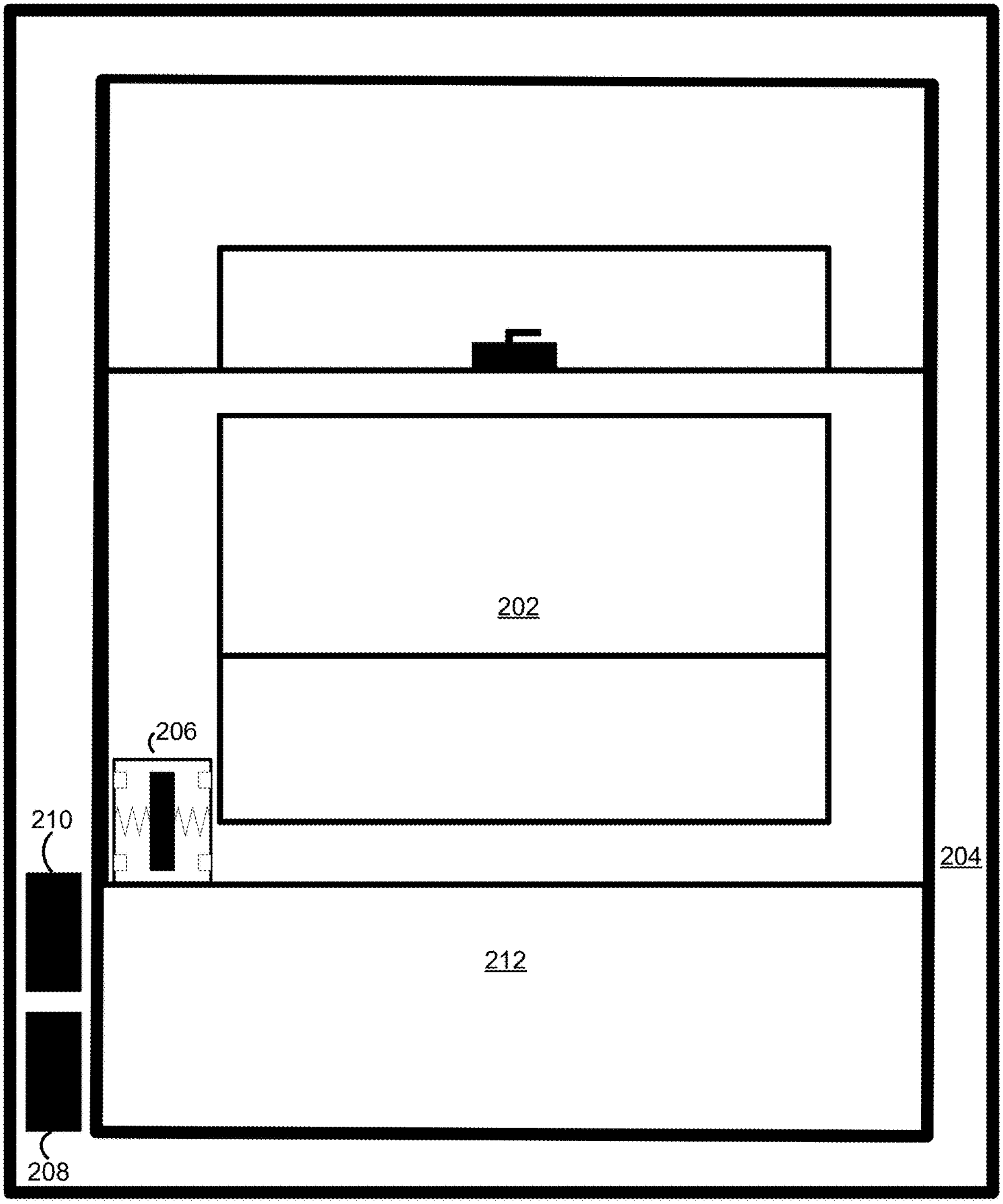
FIG. 2C shows the entry point barrier in a third position.

FIG. 2C shows the entry point barrier 202 situated within the entry point barrier frame 204 in an open position, thereby creating a wider opening 212. As the entry point barrier 202 moves into the open position shown in FIG. 2C, the moveable member of the three-way switch 206 may be caused to return to a neutral position within the three-way switch 206

(e.g., as depicted in FIG. 1A). The moveable member may be caused to return to the neutral position when the entry point barrier 202 is at a neutral point along a path of travel within the entry point barrier frame The neutral point may be at a point along the path of travel at which neither the first object 208 nor the second object 210 cannot act upon, or detect, the moveable member of the three-way switch 206 (e.g., a point along the path of travel that is past both the first object 208 and the second object 210). When the entry point barrier 202 is at the neutral point along the path of travel within the entry point barrier frame 204 shown in FIG. 2C, the moveable member of the three-way switch 206 may be sufficiently far from each of the bar magnet of the first object 208 and the bar magnet of the second object 210 such that neither bar magnet is acting upon the moveable member with sufficient force as to cause the moveable member to be attracted to, or repelled by, either first object 208 or the second object 210. As a result, the moveable member may not be in contact with either the conductive interface affixed to the first side of the three-way switch 206 or the conductive interface affixed to the opposite side of the three-way switch 206 (e.g., second conductive interface 116), and the three-way switch 206 may indicate to the security system that the circuit associated with the conductive interface affixed to the first side of the three-way switch 206 is open and the circuit associated with the conductive interface affixed to the opposite side of the three-way switch 206 is also open.

As described above, the second object 210 may be an electronic device, such as a Bluetooth™ sensor, RFID sensor, or the like. The second object 210 may detect a presence of the three-way switch 206 and/or the moveable member when it comes into proximity. When the entry point barrier 202 is at the open position shown in FIG. 2C, both the first object 208 and the second object 210 may separately indicate to the security system that the three-way switch 206 and/or the moveable member is not proximate and/or not detected.

The security system may determine that the entry point barrier 202 is in the open position shown in FIG. 2C based on the three-way switch 206 indicating that the circuit associated with the conductive interface affixed to the first side of the three-way switch 206 is open and the circuit associated with the conductive interface affixed to the opposite side of the three-way switch 206 is also open. The security system may determine that the entry point barrier 202 is in the open position shown in FIG. 2C based on the first object 208 indicating that the three-way switch 206 and/or the moveable member is not proximate to it as well as the second object 210 indicating that the three-way switch 206 and/or the moveable member is not proximate to it. Based on (e.g., in response to) determining that the entry point barrier 202 is in the open position, the security system may cause one or more security system policies may be triggered.

Figure 2D:
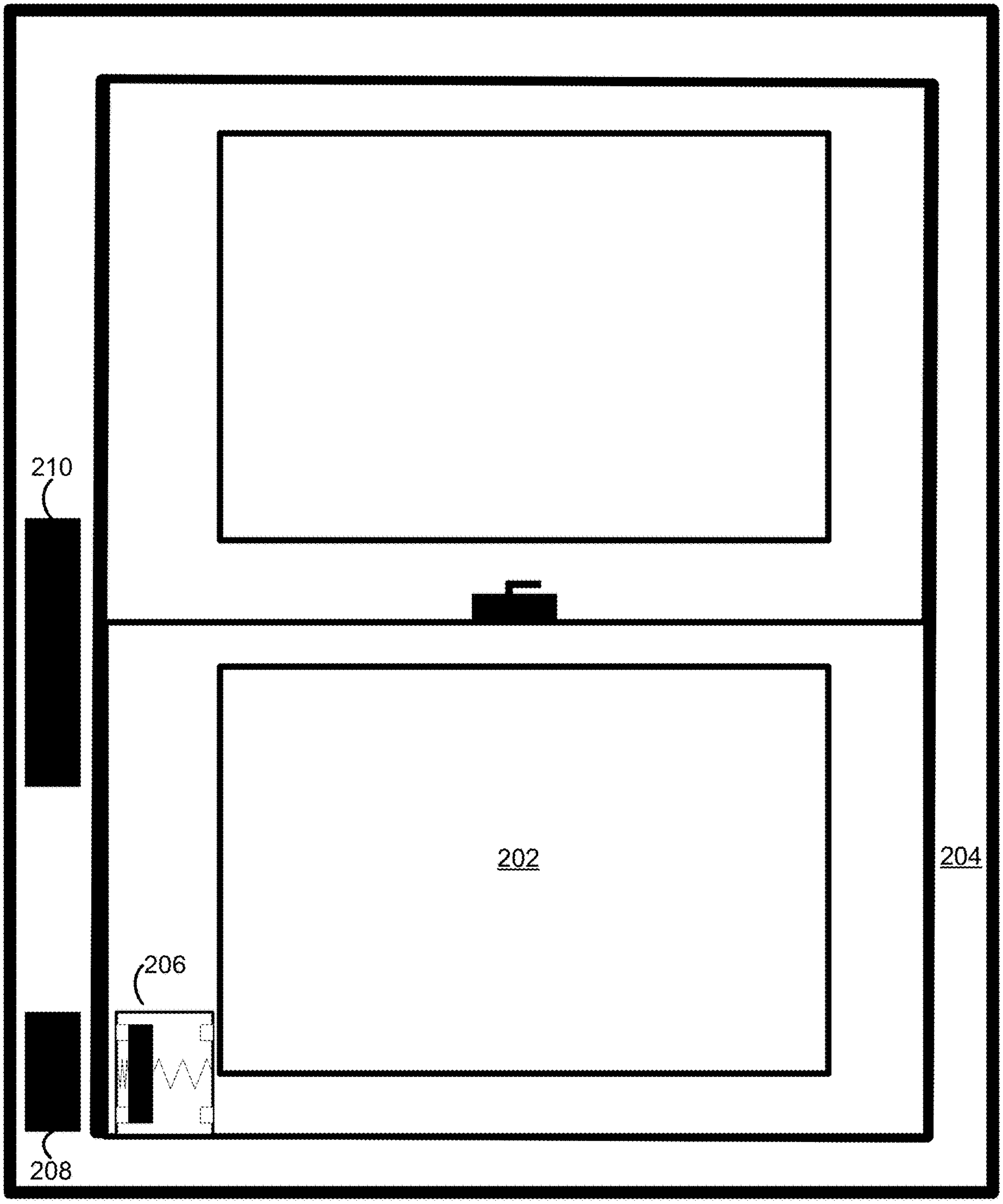
FIG. 2D shows a configuration of the entry point barrier in the first position.
Figure 2E:
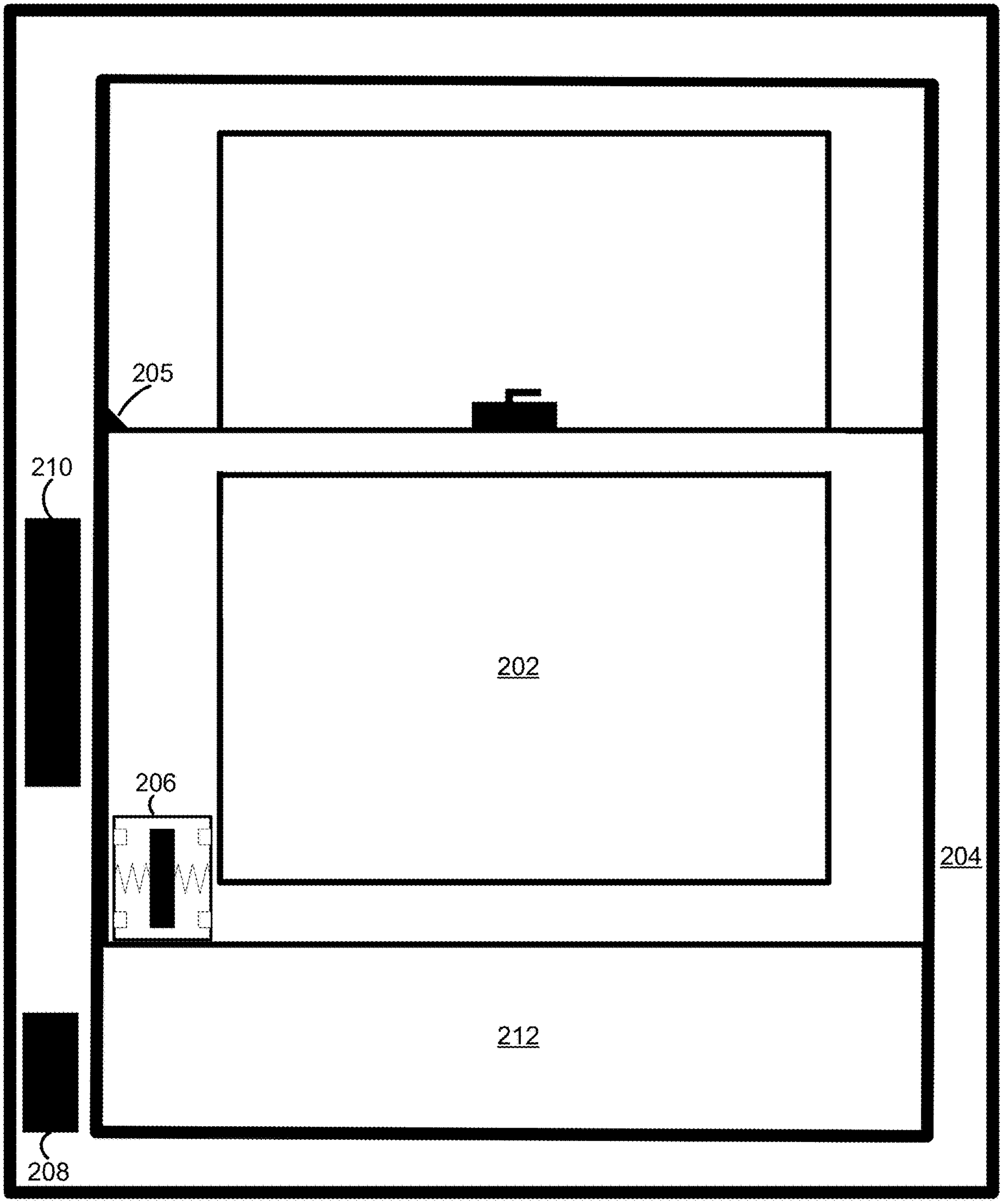
FIG. 2E shows the configuration of the entry point barrier in the second position.
Figure 2F:
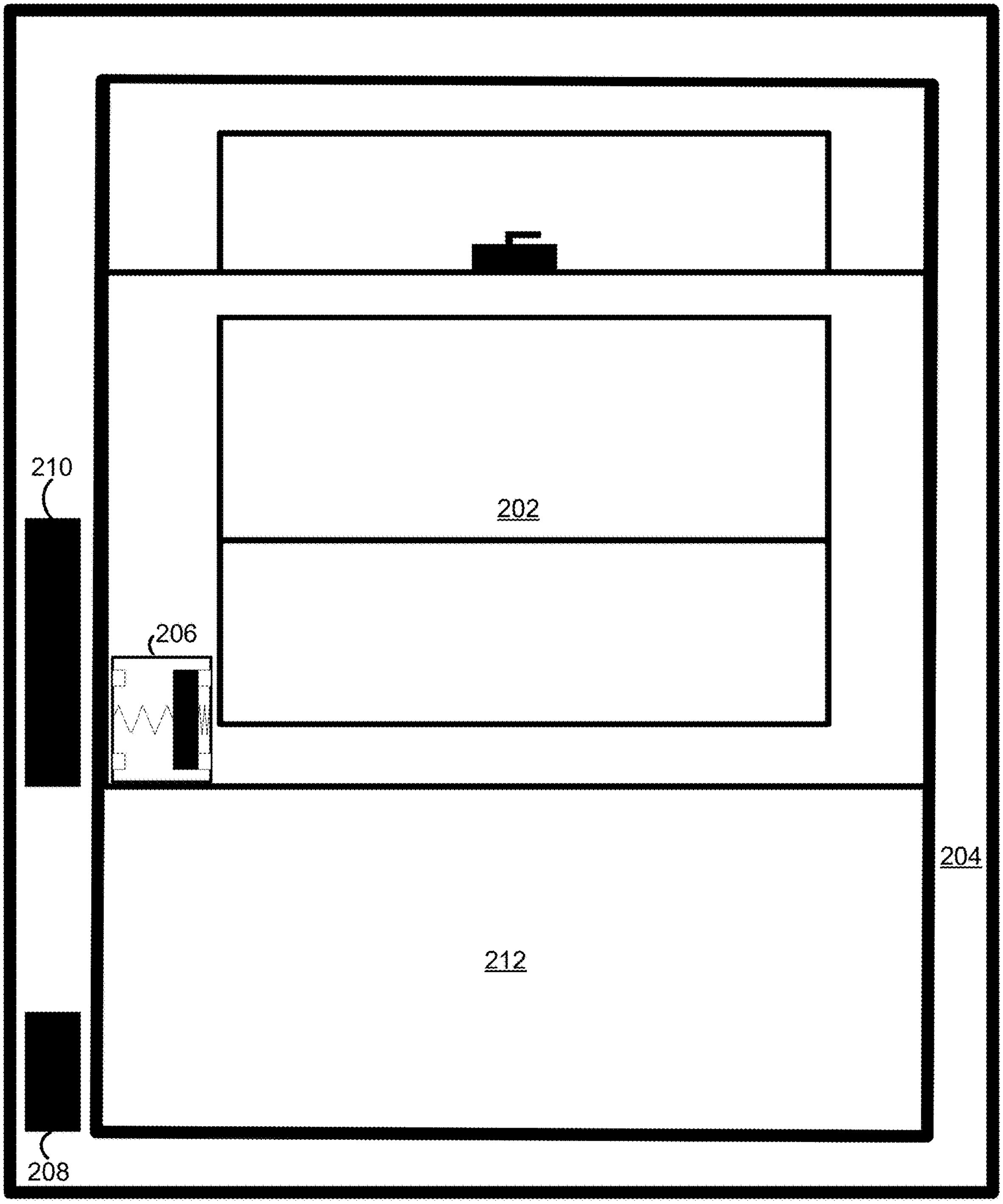
FIG. 2F shows the configuration of the entry point barrier in the third position.

FIGS. 2D-2F show an alternative configuration of the entry point barrier 202 with the first object 208 located at the bottom of the entry point barrier frame 204 and the second object 210, which may be larger than the first object 208 in this alternative configuration, located at approximately a midpoint of the entry point barrier frame 204. It should be noted that the second object 210, as shown in the alternative configuration of the entry point barrier 202 in FIGS. 2D-2F, may be larger or smaller in further configurations. The position at which the second object 210 is affixed to the entry point barrier frame 204 may be adjusted in these further configurations. The size and position of the second object 210 may be adjusted based on a given application (e.g., based on the size of the entry point barrier 202). Additionally, the size and position of the second object 210 may be adjusted to provide a wider range, or a narrower range, of movement along the path of travel within the entry point barrier frame 204 that corresponds to the entry point barrier 202 being in the ajar position.

FIG. 2D shows the entry point barrier 202 situated within the entry point barrier frame 204 in the closed position. When the entry point barrier is in the closed position, the first object 208 may cause the moveable member of the three-way switch 206 to be attracted to the first object 208. The moveable member may then move along the path of travel within the three-way switch 206 until it comes into contact with the conductive interface (e.g., the first conductive interface 114) affixed to the first side of the three-way switch 206. The three-way switch 206 may then provide an indication to the security system that the moveable member is in contact with the conductive interface affixed to the first side of the three-way switch 206 (e.g., indicating to the security system that a circuit associated with the conductive interface affixed to the first side of the three-way switch 206 has been closed).

As with the configuration shown in FIGS. 2A-2C, the first object may 208 be an electronic device, such as a Bluetooth™ sensor, Radio Frequency Identification ("RFID") sensor, or the like. The first object 208 may detect a presence of the three-way switch 206 and/or the moveable member when it comes into proximity. The first object 208 may then indicate to the security system that the three-way switch 206 and/or the moveable member is proximate to it. The security system may determine that the entry point barrier 202 is in the closed position based on the three-way switch indicating that the circuit associated with the conductive interface affixed to the first side of the three-way switch 206 has been closed. The security system may determine that the entry point barrier 202 is in the closed position based on the first object 208 (e.g., an electronic device) indicating that the three-way switch 206 and/or the moveable member is proximate to it. Based on (e.g., in response to) determining that the entry point barrier 202 is in the closed position, the security system may cause one or more security system policies may be triggered.

FIG. 2E shows the alternative configuration of the entry point barrier 202 situated within the entry point barrier frame 204 in the ajar position, thereby creating the opening 212. The ajar position may correspond to a point on the entry point barrier frame 204 at which the secondary entry point lock 205 is located. As the entry point barrier 202 moves into the ajar position as shown in FIG. 2E, the moveable member of the three-way switch 206 may be caused to return to the neutral position within the three-way switch 206 (e.g., as depicted in FIG. 1A). The moveable member may be caused to return to the neutral position when the entry point barrier 202 is at the neutral point along a path of travel within the entry point barrier frame. As described above with respect to the configuration shown in FIGS. 2A-2C, the neutral point may be at a point along the path of travel at which the first object 208 cannot act upon, or detect, the moveable member of the three-way switch 206. The neutral point may also be at a point along the path of travel at which the second object 210 cannot act upon, or detect, the moveable member of the three-way switch 206.

As with the configuration shown in FIGS. 2A-2C, the first object 208 and the second object 210 may each include a bar magnet. The bar magnet of the first object 208 may have a first polarity, and the bar magnet of the second object 210 may have an opposite, second polarity. When the entry point barrier 202 is at the neutral point along the path of travel within the entry point barrier frame 204, as shown in FIG. 2E, the moveable member of the three-way switch 206 may be sufficiently far from each of the bar magnet of the first object 208 and the bar magnet of the second object 210 such that neither bar magnet is acting upon the moveable member with sufficient force as to cause the moveable member to be attracted to, or repelled by, either object 208,210. As a result, the moveable member may not be in contact with either the conductive interface affixed to the first side of the three-way switch 206 or the conductive interface affixed to the opposite side of the three-way switch 206 (e.g., second conductive interface 116). As a result, the three-way switch 206 may indicate to the security system that the circuit associated with the conductive interface affixed to the first side of the three-way switch 206 is open and a circuit associated with the conductive interface affixed to the opposite side of the three-way switch 206 is also open.

As with the configuration shown in FIGS. 2A-2C, the second object 210 may be an electronic device, such as a Bluetooth™ sensor, RFID sensor, or the like. The second object 210 may detect a presence of the three-way switch 206 and/or the moveable member when it comes into proximity. When the entry point barrier 202 is at the ajar position shown in FIG. 2E, the first object 208 may indicate to the security system that the three-way switch 206 and/or the moveable member is not proximate to it. Likewise, when the entry point barrier is at the ajar position shown in FIG. 2E, the second object 210 may indicate to the security system that the three-way switch and/or the moveable member is not proximate to it.

The security system may determine that the entry point barrier 202 is in the ajar position as shown in FIG. 2E based on the three-way switch 206 indicating that the circuit associated with the conductive interface affixed to the first side of the three-way switch 206 is open and the circuit associated with the conductive interface affixed to the opposite side of the three-way switch 206 is also open. The security system may determine that the entry point barrier 202 is in the ajar position shown in FIG. 2E based on the first object 208 indicating that the three-way switch 206 and/or the moveable member is not proximate to it as well as the second object 210 indicating that the three-way switch 206 and/or the moveable member is not proximate to it. Based on (e.g., in response to) determining that the entry point barrier 202 is in the ajar position, the security system may cause one or more security system policies may be triggered.

FIG. 2F shows the alternative configuration of the entry point barrier 202 situated within the entry point barrier frame 204 in the open position, thereby creating a wider opening 212. The open position shown in FIG. 2F may correspond to a point on the entry point barrier frame 204 past the entry point barrier lock 205. As the entry point barrier 202 moves into the open position shown in FIG. 2F, the moveable member of the three-way switch 206 may come into proximity with the second object 210. As described earlier, the second object 210 may include a bar magnet having a second polarity that is opposite of the first polarity of the bar magnet of the first device 208. The bar magnet of the second object 210 may act upon the moveable member and cause it to be repelled by the second object 210. The moveable member may then move along the path of travel within the three-way switch until it comes into contact with the conductive interface affixed to the opposite side of the three-way switch 206. As a result, the three-way switch 206 may indicate to the security system that the circuit associated with the conductive interface affixed to the opposite side of the three-way switch 206 is closed.

As with the configuration shown in FIGS. 2A-2C, the second object 210 may detect a presence of the three-way switch 206 and/or the moveable member when it comes into proximity (e.g., via Bluetooth™, RFID, or the like) as shown in FIG. 2F. When the second object 210 detects a presence of the moveable member, it may indicate to the security system that the three-way switch 206 and/or the moveable member is not proximate to it. The security system may determine that the entry point barrier 202 is in the open position as shown in FIG. 2F based on the three-way switch 206 indicating that the circuit associated with the conductive interface affixed to the opposite side of the three-way switch 206 is closed. The security system may determine that the entry point barrier 202 is in the open position as shown in FIG. 2F based on the second object 210 indicating that the three-way switch and/or the moveable member is proximate to it. Based on (e.g., in response to) determining that the entry point barrier 202 is in the open position, the security system may cause one or more security system policies may be triggered.

Figure 3A:
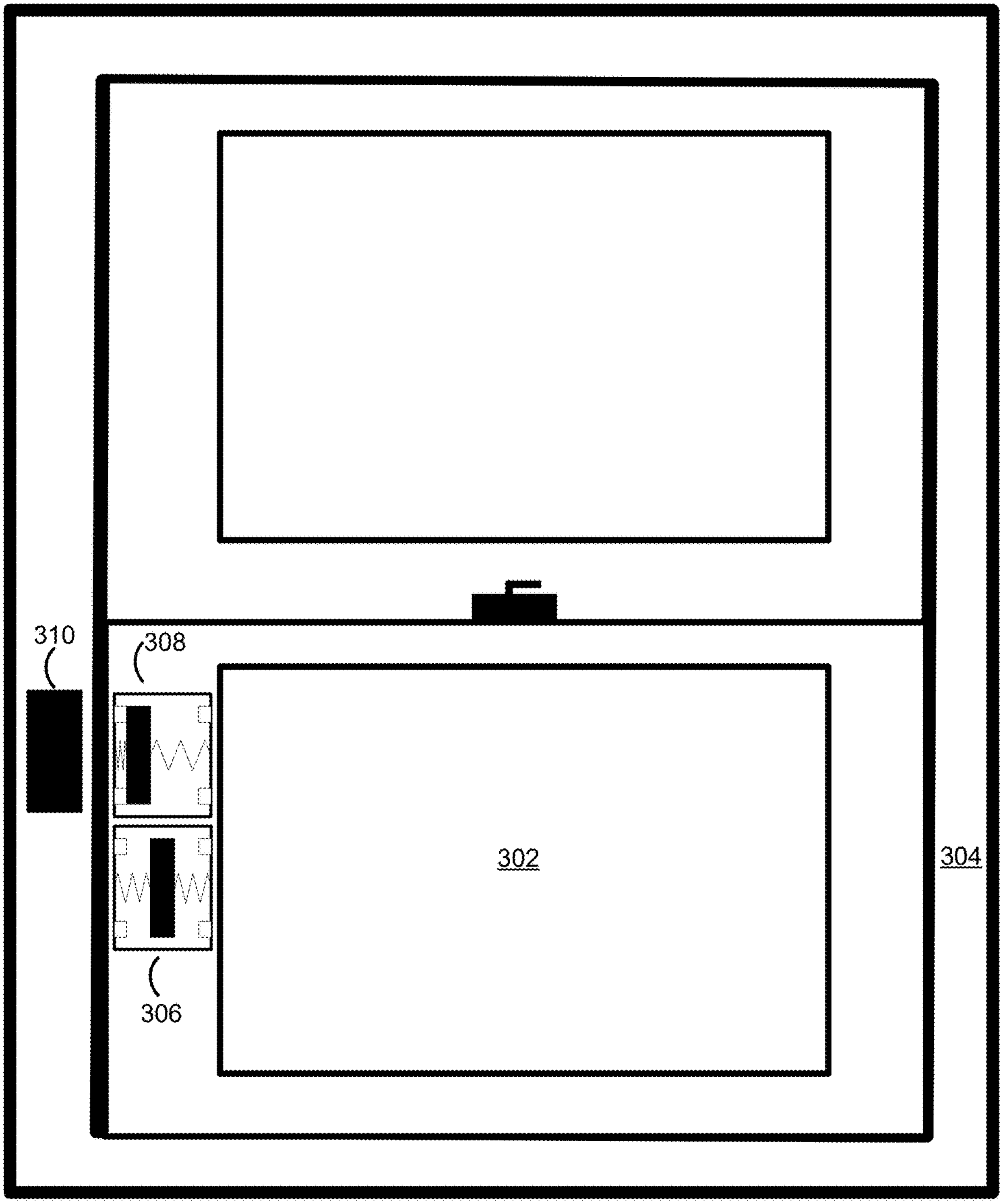
FIG. 3A shows an exemplary entry point barrier in a first position.
Figure 3B:
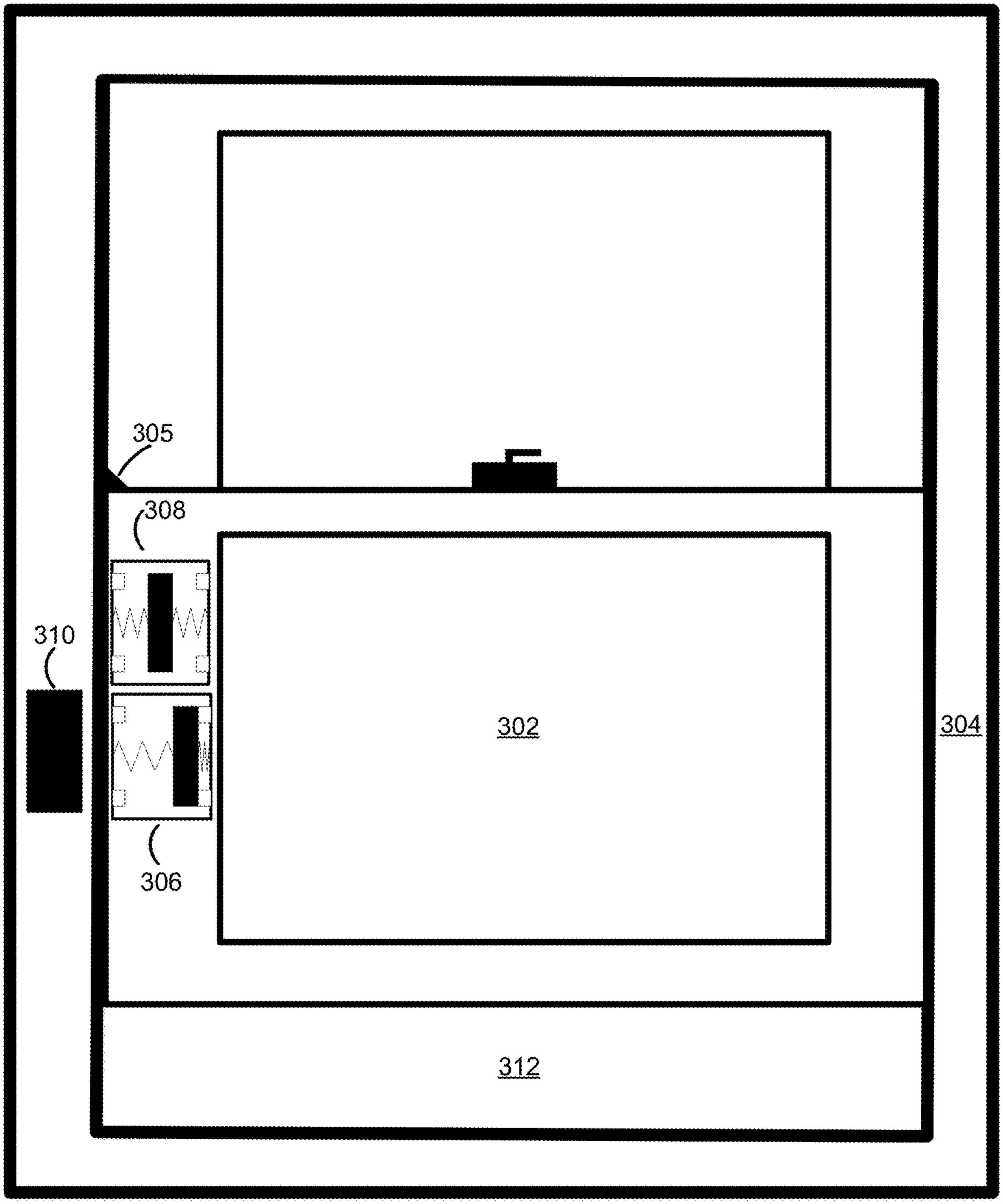
FIG. 3B shows the entry point barrier in a second position.
Figure 3C:
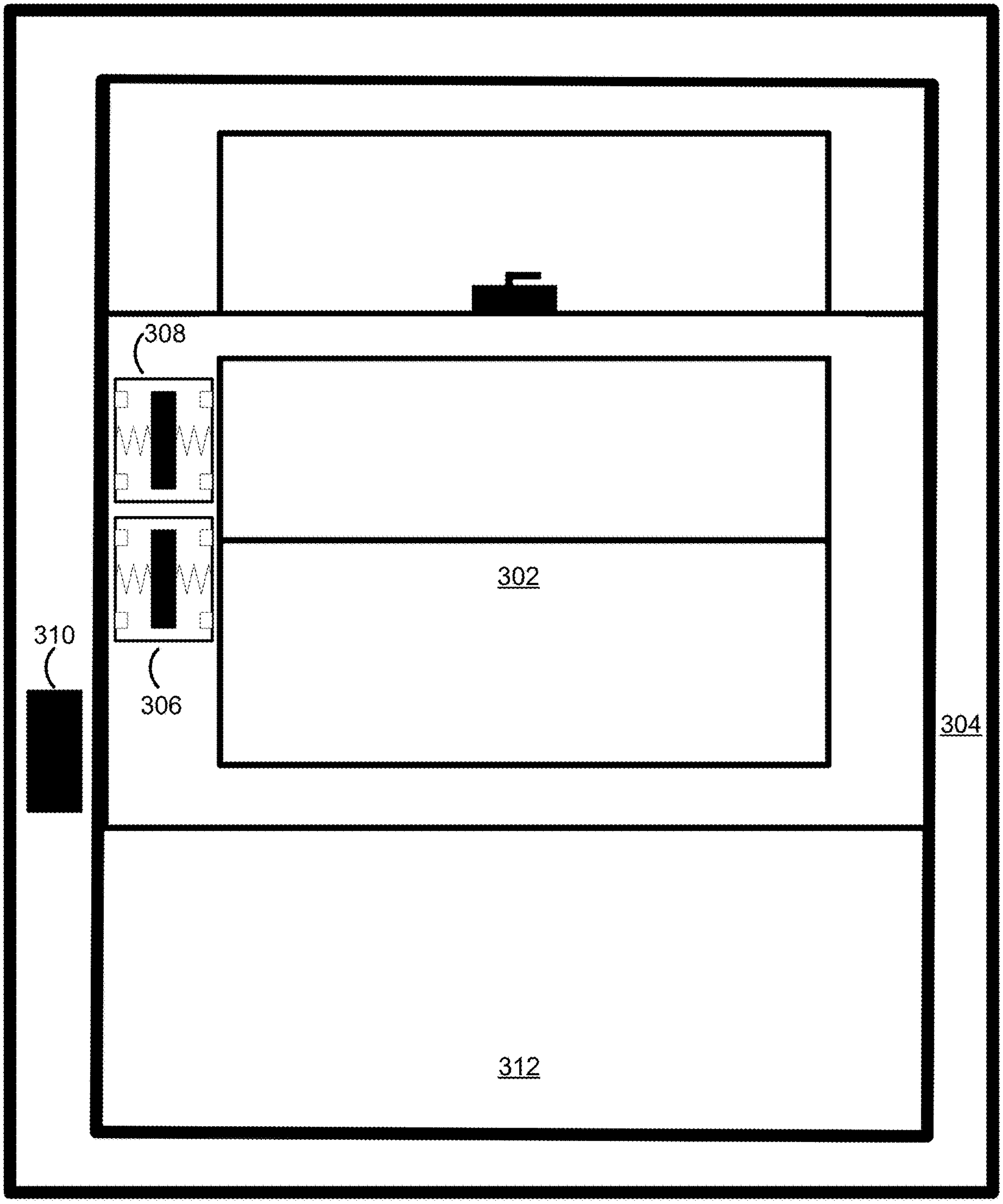
FIG. 3C shows the entry point barrier in a third position.

While FIGS. 2A-2F show configurations using a single three-way switch 206 and two objects 208 and 210, it is to be understood that further alternative configurations may be implemented to achieve the same or similar end (e.g., determining whether an entry point barrier is closed, ajar, or fully opened). FIGS. 3A-3C show such an alternative configuration that uses two three-way switches 306 and 308, each being affixed to a planar surface of an entry point barrier 302, and an object 310 affixed to a frame of the entry point barrier 304. FIG. 3A shows the entry point barrier 302 (e.g., a window, entry point 202, etc.) situated within the entry point barrier frame 304 (e.g., a window frame, entry point frame 204, etc.) in a closed position.

A first three-way switch 306 and a second three-way switch 308, such as two devices 100, may each be affixed to a planar surface of the entry point barrier 302. An object 310 (e.g., a magnetic element, an electronic device, first object 208, second object 210, etc.) may be affixed to a planar surface of the entry point barrier frame 204 at a position along a direction of travel of the entry point barrier 302. The first three-way switch 306 and 308 may each have a moveable member (e.g., longitudinal member 110) enclosed within that may be caused to move along a path of travel parallel to a top and a bottom of each respective three-way switch 306 and 308 when the object 310 is proximate to either three-way switch 306 or 308 and acts upon the respective moveable member(s).

When the entry point barrier 302 is in the closed position, the object 310 may cause the moveable member of the second three-way switch 308 to be attracted to the object 310. The moveable member may then move along the path of travel within the second three-way switch 308 until it comes into contact with a conductive interface (e.g., the first conductive interface 114) affixed to a first side of the second three-way switch 308 (e.g., a side of the three-way switch adjacent to the object 310). The first three-way switch 308 may be in communication with a security system (e.g., wired or wireless) and configured to provide an indication when the moveable member is in contact with the conductive interface affixed to the first side of the second three-way switch 308 (e.g., indicating to the security system that a circuit associated with the conductive interface affixed to the first side of the second three-way switch 308 has been closed). The object 310 may also be an electronic device, such as a Bluetooth™ sensor, RFID sensor, or the like. The object 310 may detect a presence of the second three-way switch 308 and/or the moveable member when it comes into proximity. The object 310 may then indicate to the security system that the first three-way switch 306 and/or the moveable member is proximate to it.

When the entry point barrier 302 is in the closed position, the moveable member of the first three-way switch 306 may be sufficiently far from the bar magnet of the object 310 such that the bar magnet cannot act upon the moveable member with sufficient force as to cause the moveable member to be attracted to, or repelled by, the object 310. As a result, the moveable member of the first three-way switch 306 may not be in contact with either a conductive interface affixed to a first side of the first three-way switch 306 or a conductive interface affixed to an opposite side of the first three-way switch 306 (e.g., a side of the three-way switch opposite to the first side). As a result, the first three-way switch 306 may indicate to the security system that a circuit associated with the conductive interface affixed to the first side is open and a circuit associated with the conductive interface affixed to the opposite side is also open.

The security system may determine that the entry point barrier 302 is in the closed position based on the second three-way switch 308 indicating that the circuit associated with the conductive interface affixed to the first side has been closed. The security system may determine that the entry point barrier 302 is in the closed position based on the object 310 (e.g., an electronic device) indicating that the second three-way switch 308 and/or the moveable member is proximate to it. Based on (e.g., in response to) determining that the entry point barrier 302 is in the closed position, the security system may cause one or more security system policies may be triggered.

FIG. 3B shows the entry point barrier 302 situated within the entry point barrier frame 304 in an ajar position, thereby creating an opening 312. The ajar position may correspond to a point on the entry point barrier frame 304 at which a secondary entry point lock 305 is located. As the entry point barrier 302 moves into the ajar position, the moveable member of the first three-way switch 306 may be caused to move into a neutral position within the first three-way switch 306 (e.g., as depicted in FIG. 1A). The moveable member may be caused to move into the neutral position when the entry point barrier 302 is at a neutral point along a path of travel within the entry point barrier frame 304. The neutral point may be at a point along the path of travel at which the object 310 cannot act upon, or detect, the moveable member of the second three-way switch 308.

The object 310 may include a bar magnet having a polarity that is opposite of a polarity of the moveable member of the first three-way switch 306. The bar magnet of the object 310 may act upon the moveable member of the first three-way switch 306 and cause it to be repelled by the object 310. The moveable member of the first three-way switch 306 may then move along the path of travel within the three-way switch until it comes into contact with a conductive interface affixed to the opposite side of the of the first three-way switch 306. As a result, the first three-way switch 306 may indicate to the security system that a circuit associated with the conductive interface affixed to the opposite side of the first three-way switch 306 is closed.

The object 310 may detect a presence of the first three-way switch 306 and/or the moveable member when it comes into proximity (e.g., via Bluetooth™, RFID, or the like). When the object 310 detects a presence of the moveable member of the first three-way switch 306 but it does not detect a presence of the of the moveable member of the second three-way switch 308, it may indicate to the security system that the first three-way switch 306 and/or its moveable member is not proximate to the object 310

The security system may determine that the entry point barrier 302 is in an ajar position based on the first three-way switch 306 indicating that the circuit associated with the conductive interface affixed to the opposite side of the three-way switch is closed and the second three-way switch 308 indicating that both associated circuits are open. The security system may determine that the entry point barrier 302 is in the open position based on the object 310 indicating that the three-way switch and/or the moveable member of the first three-way switch 306 is proximate to it (e.g., detected) but the moveable member of the second three-way switch 308 is not proximate to it (e.g., not detected). Based on (e.g., in response to) determining that the entry point barrier 302 is in the ajar position, the security system may cause one or more security system policies may be triggered.

FIG. 3C shows the entry point barrier 302 situated within the entry point barrier frame 304 in an open position, thereby creating a wider opening 312. The open position may correspond to a point on the entry point barrier frame 304 past the entry point barrier lock 305. As the entry point barrier 302 moves into the open position, neither the moveable member of the first three-way switch 306 for the moveable member of the second three-way switch 308 be in proximity to the object 310. Further, as the entry point barrier 302 moves into the open position, the moveable member of the first three-way switch 306 may be caused to return to a neutral position (e.g., as depicted in FIG. 1A). The moveable member of the first three-way switch 306 may be caused to return to the neutral position when the entry point barrier 302 is at a neutral point along a path of travel within the entry point barrier frame 304. The moveable member of the second three-way switch 308 may remain in a neutral position when the entry point barrier 302 is at the neutral point along a path of travel within the entry point barrier frame 304. The neutral point may be at a point along the path of travel at which the object 310 cannot act upon, or detect, either the moveable member of the first three-way switch 306 or the moveable member of the second three-way switch 308. When the entry point barrier 302 is at the neutral point along the path of travel within the entry point barrier frame 304, the moveable member of each three-way switch 306 and 308 may be sufficiently far from the bar magnet of the object 310 such that the bar magnet cannot act upon either moveable member with sufficient force as to cause either moveable member to be attracted to, or repelled by, the object 310. As a result, neither moveable member may not be in contact with a respective conductive interface. Each three-way switch 306 and 308 may indicate to the security system that each associated circuit of each three-way switch 306 and 308 is open.

The object 310 may be an electronic device, such as a Bluetooth™ sensor, RFID sensor, or the like. When the entry point barrier 302 is at the open position, the object 310 may indicate to the security system that neither the first three-way switch 306 nor the second three-way switch 308 is proximate to the object 310. The security system may determine that the entry point barrier 302 is in the open position based on each three-way switch 306 and 308 indicating that each associated circuit of each three-way switch 306 and 308 is open. The security system may determine that the entry point barrier 302 is in the open position based on the object 310 indicating that neither the first three-way switch 306 nor the second three-way switch 308 is proximate to the object 310. Based on (e.g., in response to) determining that the entry point barrier 302 is in the open position, the security system may cause one or more security system policies may be triggered.

Figure 4A:
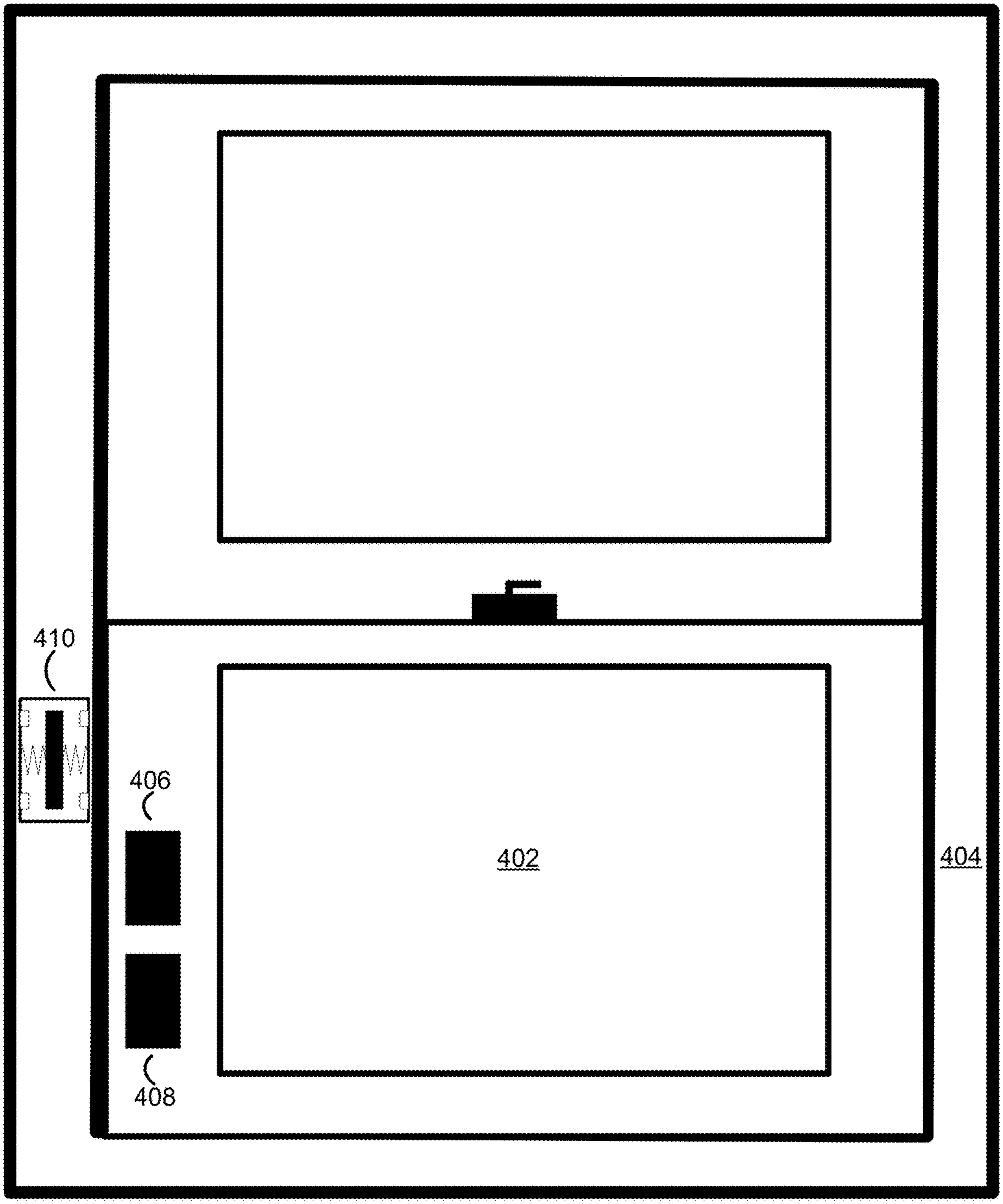
FIG. 4A shows an exemplary entry point barrier in a first position.
Figure 4B:
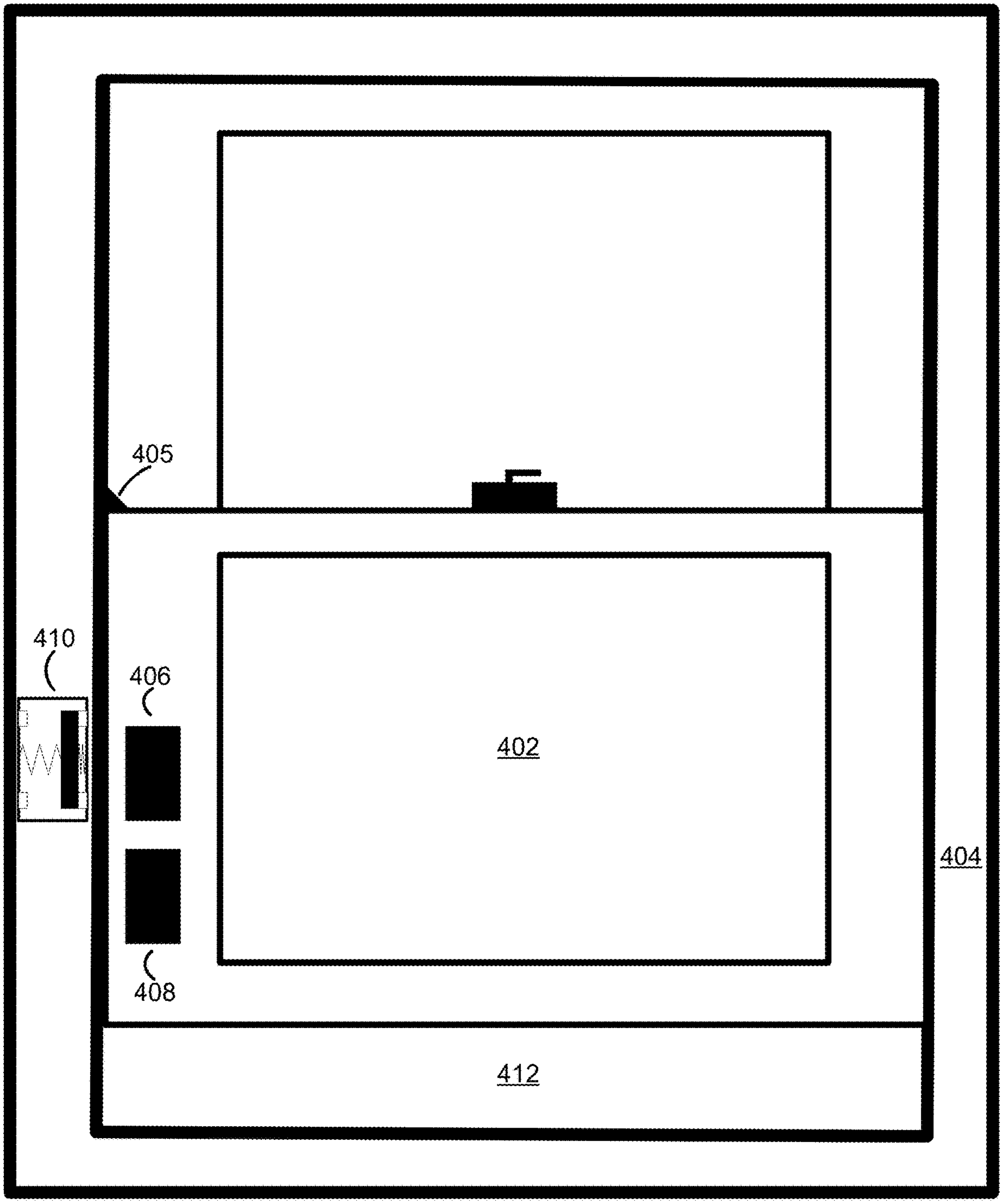
FIG. 4B shows the entry point barrier in a second position.
Figure 4C:
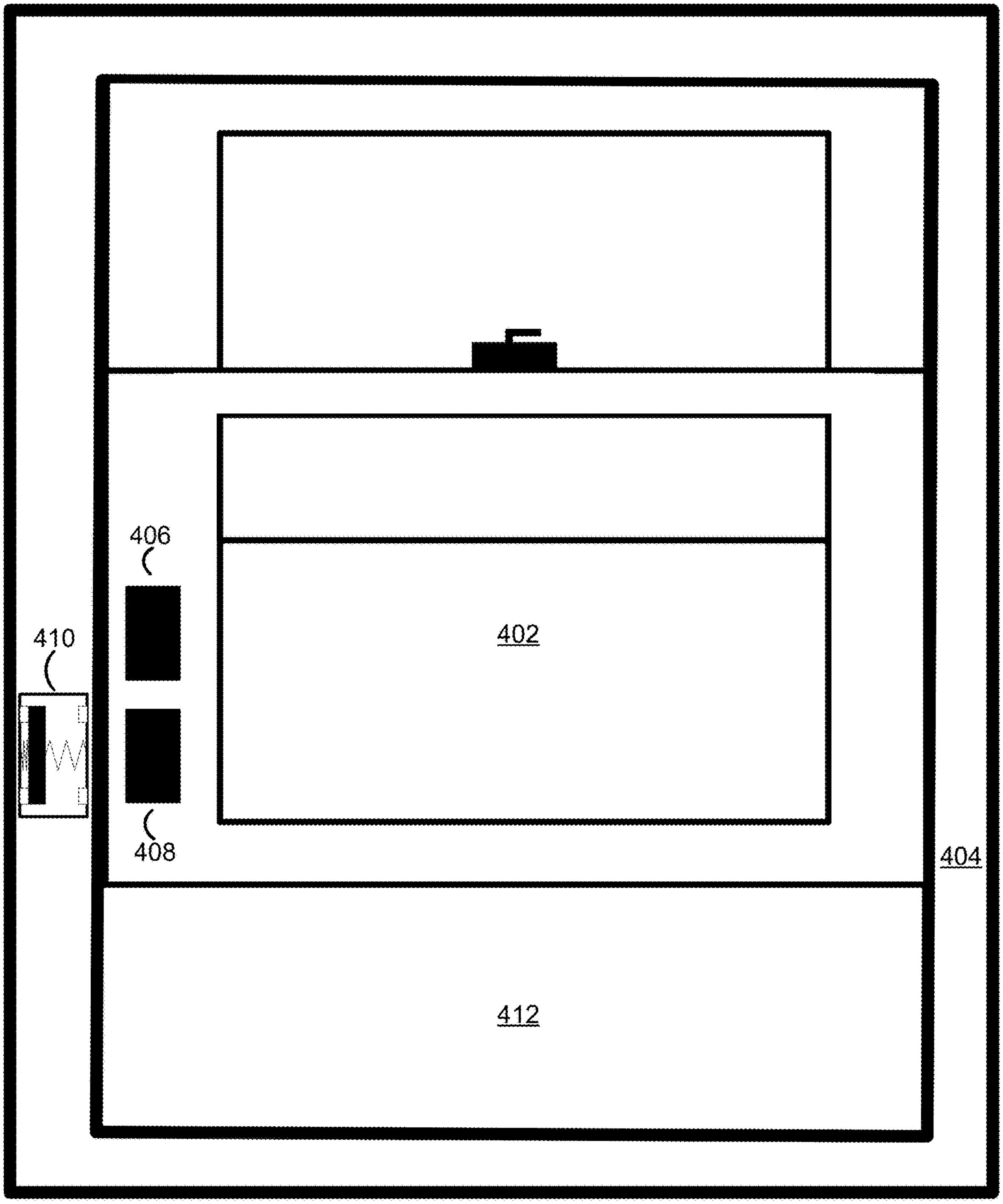
FIG. 4C shows the entry point barrier in a third position.

FIGS. 4A-4C show another alternative configuration that uses one three-way switch 410 affixed to a planar surface of an entry point barrier frame 404 and two objects 406 and 408 each affixed an entry point barrier 402. FIG. 4A shows an entry point barrier 402 (e.g., a window) situated within an entry point barrier frame 404 (e.g., a window frame) in a closed position. A three-way switch 410, such as the device 100, may be affixed to a planar surface of the entry point barrier frame 404 at a position along a direction of travel of the entry point barrier 402. A first object 408 (e.g., a magnetic element) may be affixed to a planar surface of the entry point barrier 402, and a second object 406 (e.g., a magnetic element) may be affixed to the planar surface of the entry point barrier 402 above the first object 408. The three-way switch 410 may have a moveable member (e.g., longitudinal member 110) enclosed within that may be caused to move along a path of travel parallel to a top and a bottom of the three-way switch 410 when the first object 408 or the second object 406 is proximate to the three-way switch 410 and acts upon the moveable member.

The first object 408 and the second object 406 may each include a bar magnet. The bar magnet of the first object 408 may have a first polarity, and the bar magnet of the second object 406 may have an opposite, second polarity. When the entry point barrier 402 is in a closed position, the moveable member of the three-way switch 410 may be sufficiently far from each of the bar magnet of the first object 408 and the bar magnet of the second object 406 such that neither bar magnet is acting upon the moveable member with sufficient force as to cause the moveable member to be attracted to, or repelled by, either object 406 or 406. As a result, the moveable member may not be in contact with either a conductive interface affixed to the first side of the three-way switch 410 (e.g., first conductive interface 114) or a conductive interface (e.g., second conductive interface 116) affixed to an opposite side of the three-way switch 410 (e.g., a side of the three-way switch opposite to the first side). As a result, the three-way switch 410 may indicate to the security system that the circuit associated with the conductive interface affixed to the first side of the three-way switch 410 is open and a circuit associated with the conductive interface affixed to the opposite side of the three-way switch 410 is also open.

The first object 408 may be an electronic device, such as a Bluetooth™ sensor, RFID sensor, or the like. The first object 408 may detect a presence of the three-way switch 410 and/or the moveable member when it comes into proximity. When the entry point barrier is at the closed position, the first object 408 may indicate to the security system that the three-way switch 410 and/or the moveable member is not proximate to it. When the entry point barrier is at the closed position, the first object 408 may indicate to the security system that the three-way switch 410 and/or the moveable member is not proximate to it. Likewise, the second object 406 may be an electronic device, such as a Bluetooth™ sensor, RFID sensor, or the like. The second object 406 may detect a presence of the three-way switch 410 and/or the moveable member when it comes into proximity. When the entry point barrier is at the closed position, the second object 406 may indicate to the security system that the three-way switch 410 and/or the moveable member is not proximate to it.

The security system may determine that the entry point barrier 402 is in the closed position based on the three-way switch 410 indicating that the circuit associated with the conductive interface affixed to the first side of the three-way switch 410 is open and the circuit associated with the conductive interface affixed to the opposite side of the three-way switch 410 is also open. The security system may determine that the entry point barrier 402 is in the closed position based on the first object 408 and second object 406 both indicating that the three-way switch 410 and/or the moveable member is not proximate to either object 406 or 408. Based on (e.g., in response to) determining that the entry point barrier 402 is in the closed position, the security system may cause one or more security system policies may be triggered.

FIG. 4B shows the entry point barrier 402 situated within the entry point barrier frame 404 in an ajar position, thereby creating an opening 412. The ajar position may correspond to a point on the entry point barrier frame 404 at which a secondary entry point lock 405 is located. As the entry point barrier moves into the ajar position, the second object 406 may cause the moveable member of the three-way switch 410 to be attracted to the second object 406. The moveable member may then move along the path of travel within the three-way switch 410 until it comes into contact with a conductive interface (e.g., the first conductive interface 114) affixed to an opposite side of the three-way switch 410 (e.g., a side of the three-way switch opposite to the first side). The three-way switch 410 may be in communication with the security system (e.g., wired or wireless) and configured to provide an indication when the moveable member is in contact with the conductive interface affixed to the opposite side of the three-way switch 410 (e.g., indicating to the security system that a circuit associated with the conductive interface affixed to the opposite side of the three-way switch 410 has been closed). The second object 406 may also be an electronic device, such as a Bluetooth™ sensor, RFID sensor, or the like. The second object 406 may detect a presence of the three-way switch 410 and/or the moveable member when it comes into proximity. The second object 406 may then indicate to the security system that the three-way switch 410 and/or the moveable member is proximate to it.

When the entry point barrier 402 is in the closed position, it may be at a point along the path of travel at which the first object 406 cannot act upon, or detect, the moveable member of the three-way switch 410. The security system may determine that the entry point barrier 402 is in the ajar position based on the three-way switch 410 indicating that the circuit associated with the conductive interface affixed to the opposite side of the three-way switch 410 has been closed. The security system may determine that the entry point barrier 402 is in the closed position based on the three-way switch 410 indicating that the circuit associated with the conductive interface affixed to the opposite side of the has been closed as well as based on the first object 408 (e.g., an electronic device) indicating that the three-way switch 410 and/or the moveable member is not proximate to it (e.g., not detected). Based on (e.g., in response to) determining that the entry point barrier 402 is in the ajar position, the security system may cause one or more security system policies may be triggered.

FIG. 4C shows the entry point barrier 402 situated within the entry point barrier frame 404 in an open position, thereby creating a wider opening 412. The open position may correspond to a point on the entry point barrier frame 404 past the entry point barrier lock 405. As the entry point barrier 402 moves into the open position, the moveable member of the three-way switch 410 may come into proximity with the first object 408. The first object 408 may include a bar magnet having a second polarity that is opposite of the first polarity of the bar magnet of the second object 406. The bar magnet of the first object 408 may act upon the moveable member and cause it to be repelled by the first object 408. The moveable member may then move along the path of travel within the three-way switch 410 until it comes into contact with a conductive interface affixed to a first side of the three-way switch 410 (e.g., a side of the three-way switch adjacent to the first object 408). As a result, the three-way switch 410 may indicate to the security system that the circuit associated with the conductive interface affixed to the first side of the three-way switch 410 is closed.

The first object 408 may detect a presence of the three-way switch 410 and/or the moveable member when it comes into proximity (e.g., via Bluetooth™, RFID, or the like). When the first object 408 detects a presence of the moveable member, it may indicate to the security system that the three-way switch 410 and/or the moveable member is proximate to it. When the entry point barrier 402 is in the open position, the three-way switch 410 may be sufficiently far from the second object 406 such that the second object 406 (e.g., an electronic device) may be unable to detect a presence of the three-way switch 410 and/or the moveable member. When the second object 406 cannot detect a presence of the moveable member, it may indicate to the security system that the three-way switch 410 and/or the moveable member is not proximate to it.

The security system may determine that the entry point barrier 402 is in the open position based on the three-way switch 410 indicating that the circuit associated with the conductive interface affixed to the first side of the three-way switch 410 is closed. The security system may determine that the entry point barrier 402 is in the open position based on the three-way switch 410 indicating that the circuit associated with the conductive interface affixed to the first side of the three-way switch 410 is closed as well as based on the second object 408 indicating that the three-way switch and/or the moveable member is not proximate to it (e.g., not detected). Based on (e.g., in response to) determining that the entry point barrier 402 is in the open position, the security system may cause one or more security system policies may be triggered.

Figure 5A:
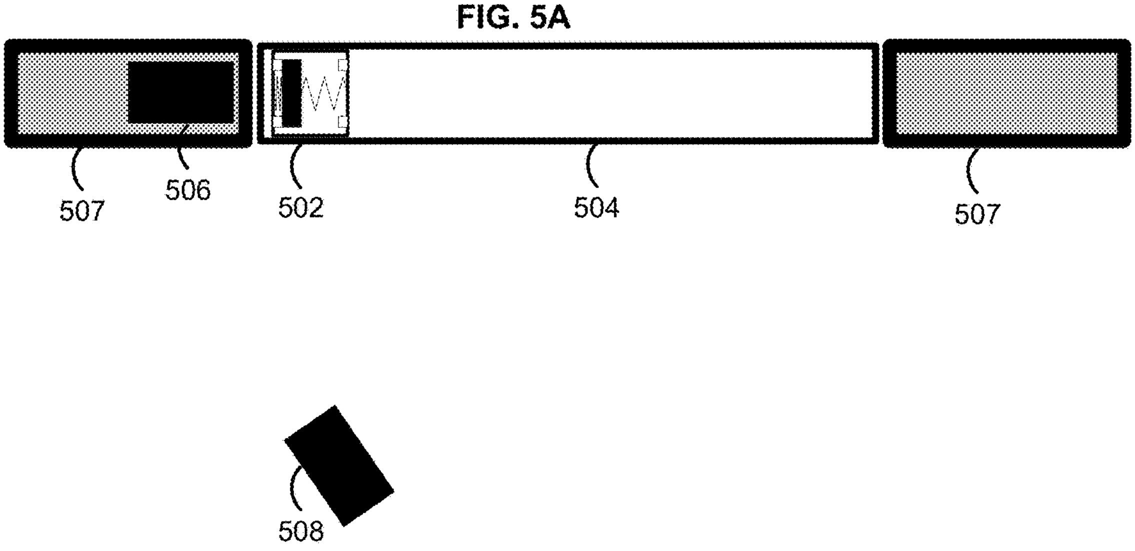
FIG. 5A shows an exemplary entry point barrier in a first position.
Figure 5B:
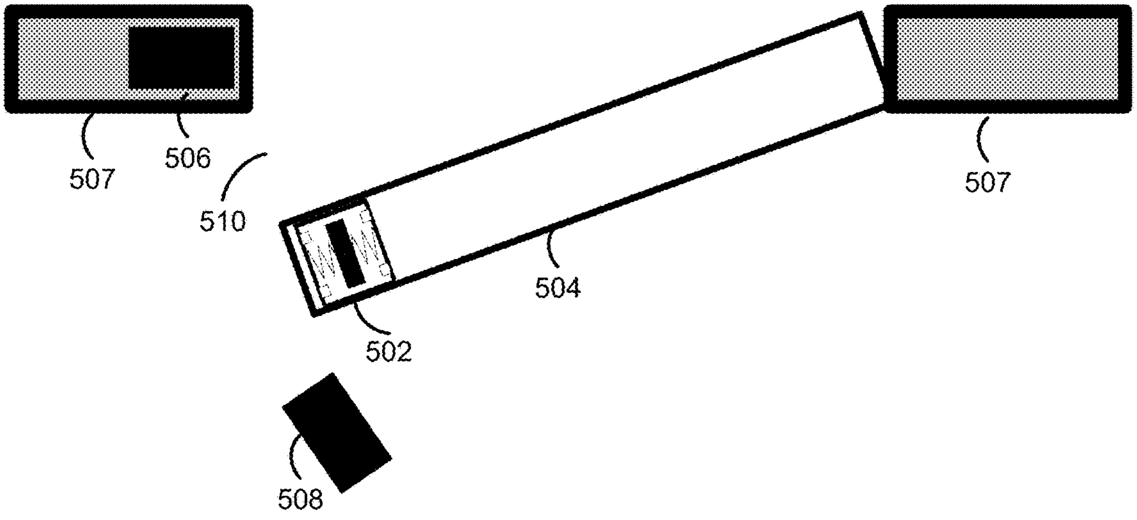
FIG. 5B shows the entry point barrier in a second position.
Figure 5C:
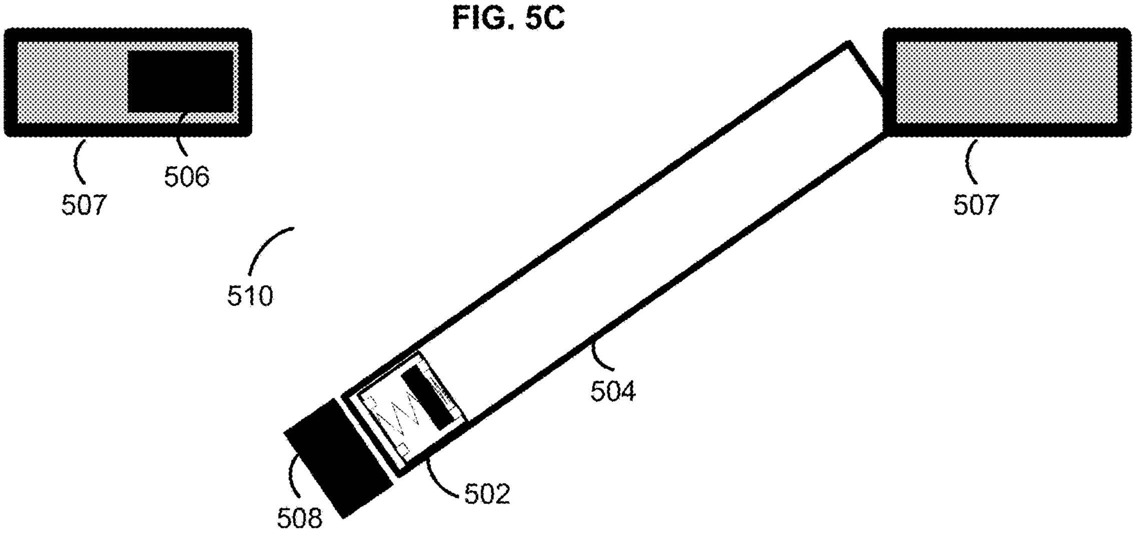
FIG. 5C shows the entry point barrier in a third position.

FIGS. 5A-5C show an overhead view of an exemplary entry point barrier 504 situated within a frame 507 (e.g., a door frame). A three-way switch 502, such as the device 100, may be affixed to a planar surface of the entry point barrier 504 (e.g., a top planar surface of a door). A first object 506 (e.g., a magnetic element) a may be affixed to a top of the frame 507 of the entry point barrier 504. A second object 508 (e.g., a magnetic element) may be placed (e.g., affixed to a ceiling perpendicular to the entry point barrier 504) adjacent to a path of travel of the entry point barrier 504. It should be noted that the first object 506 and/or the second object 508 may be larger or smaller in further configurations. The position at which the second object 508 is placed adjacent to the path of travel of the entry point barrier 504 may be adjusted in these further configurations. The size and position of the second object 508 may be adjusted based on a given application (e.g., based on the size of the entry point barrier 504 and/or the path of travel). Additionally, the size and position of the second object 508 may be adjusted to provide a wider range, or a narrower range, of movement along the path of travel of the entry point barrier 504 that corresponds to the entry point barrier 504 being in an ajar position (e.g., as shown in FIG. 5B).

FIG. 5A shows the entry point barrier 504 situated within the frame 507 in a closed position. The three-way switch 502 may have a moveable member (e.g., longitudinal member 110) enclosed within that may be caused to move along a path of travel parallel to a first side of the three-way switch 502 when the first object 506 is proximate to the three-way switch 502 and acts upon the moveable member. The first object 506 may be proximate to the three-way switch 502 when the entry point barrier 504 is in the closed position. As shown in FIG. 5A, when the entry point barrier 504 is in the closed position, the first object 506 may cause the moveable member of the three-way switch 502 to be attracted to the first object 506. The moveable member may then move along a path of travel within the three-way switch 502 until it comes into contact with a conductive interface (e.g., the first conductive interface 114) affixed to a first side of the three-way switch 502. The three-way switch 502 may then provide an indication to a security system that the moveable member is in contact with the conductive interface affixed to the first side of the three-way switch 502 (e.g., indicating to the security system that a circuit associated with the conductive interface affixed to the first side of the three-way switch 502 has been closed).

The first object may 506 be an electronic device, such as a Bluetooth™ sensor, Radio Frequency Identification ("RFID") sensor, or the like. The first object 506 may detect a presence of the three-way switch 502 and/or the moveable member when it comes into proximity. The first object 506 may then indicate to the security system that the three-way switch 502 and/or the moveable member is proximate to it. The security system may determine that the entry point barrier 504 is in the closed position based on the three-way switch 502 indicating that the circuit associated with the conductive interface affixed to the first side of the three-way switch 502 has been closed. The security system may determine that the entry point barrier 504 is in the closed position based on the first object 506 indicating that the three-way switch 502 and/or the moveable member is proximate to it. Based on (e.g., in response to) determining that the entry point barrier 504 is in the closed position, the security system may cause one or more security system policies may be triggered.

FIG. 5B shows the entry point barrier 504 situated within the frame 507 in an ajar position, thereby creating an opening 510. As the entry point barrier 504 moves into the ajar position, the moveable member of the three-way switch 502 may be caused to return to the neutral position within the three-way switch 502 (e.g., as depicted in FIG. 1A). The moveable member may be caused to return to the neutral position when the entry point barrier 504 is at a neutral point along the path of travel. The neutral point may be at a point along the path of travel at which the first object 506 cannot act upon, or detect, the moveable member of the three-way switch 502. The neutral point may also be at a point along the path of travel at which the second object 508 cannot act upon, or detect, the moveable member of the three-way switch 502.

The first object 506 and the second object 508 may each include a bar magnet. The bar magnet of the first object 506 may have a first polarity, and the bar magnet of the second object 508 may have an opposite, second polarity. When the entry point barrier 504 is at the neutral point along the path of travel, the moveable member of the three-way switch 502 may be sufficiently far from each of the bar magnet of the first object 506 and the bar magnet of the second object 508 such that neither bar magnet is acting upon the moveable member with sufficient force as to cause the moveable member to be attracted to, or repelled by, either object 506,508. As a result, the moveable member may not be in contact with either the conductive interface affixed to the first side of the three-way switch 502 or a conductive interface affixed to an opposite side of the three-way switch 502 (e.g., second conductive interface 116). As a result, the three-way switch 502 may indicate to the security system that the circuit associated with the conductive interface affixed to the first side of the three-way switch 502 is open and a circuit associated with the conductive interface affixed to the opposite side of the three-way switch 502 is also open.

The second object 508 may be an electronic device, such as a Bluetooth™ sensor, RFID sensor, or the like. The second object 508 may detect a presence of the three-way switch 502 and/or the moveable member when it comes into proximity. When the entry point barrier 504 is at the ajar position, the first object 506 may indicate to the security system that the three-way switch 502 and/or the moveable member is not proximate to it. Likewise, when the entry point barrier 504 is at the ajar position, the second object 508 may indicate to the security system that the three-way switch and/or the moveable member is not proximate to it. The security system may determine that the entry point barrier 504 is in the ajar position based on the three-way switch 502 indicating that the circuit associated with the conductive interface affixed to the first side of the three-way switch 502 is open and the circuit associated with the conductive interface affixed to the opposite side of the three-way switch 502 is also open. The security system may determine that the entry point barrier 504 is in the ajar position based on the first object 506 indicating that the three-way switch 502 and/or the moveable member is not proximate to it as well as the second object 508 indicating that the three-way switch 502 and/or the moveable member is not proximate to it. Based on (e.g., in response to) determining that the entry point barrier 504 is in the ajar position, the security system may cause one or more security system policies may be triggered.

FIG. 5C shows the entry point barrier 504 situated within the frame 507 in an open position, thereby creating a wider opening 510. As the entry point barrier 504 moves into the open position, the moveable member of the three-way switch 502 may come into proximity with the second object 508. As described earlier, the second object 508 may include a bar magnet having a second polarity that is opposite of the first polarity of the bar magnet of the first device 506. The bar magnet of the second object 508 may act upon the moveable member and cause it to be repelled by the second object 508. The moveable member may then move along the path of travel within the three-way switch until it comes into contact with the conductive interface affixed to the opposite side of the three-way switch 502. As a result, the three-way switch 502 may indicate to the security system that the circuit associated with the conductive interface affixed to the opposite side of the three-way switch 502 is closed.

The second object 508 may detect a presence of the three-way switch 502 and/or the moveable member when it comes into proximity (e.g., via Bluetooth™, RFID, or the like). When the second object 508 detects a presence of the moveable member, it may indicate to the security system that the three-way switch 502 and/or the moveable member is not proximate to it. The security system may determine that the entry point barrier 504 is in the open position based on the three-way switch 502 indicating that the circuit associated with the conductive interface affixed to the opposite side of the three-way switch 502 is closed. The security system may determine that the entry point barrier 504 is in the open position based on the second object 508 indicating that the three-way switch and/or the moveable member is proximate to it. Based on (e.g., in response to) determining that the entry point barrier 504 is in the open position, the security system may cause one or more security system policies may be triggered.

Figure 6:
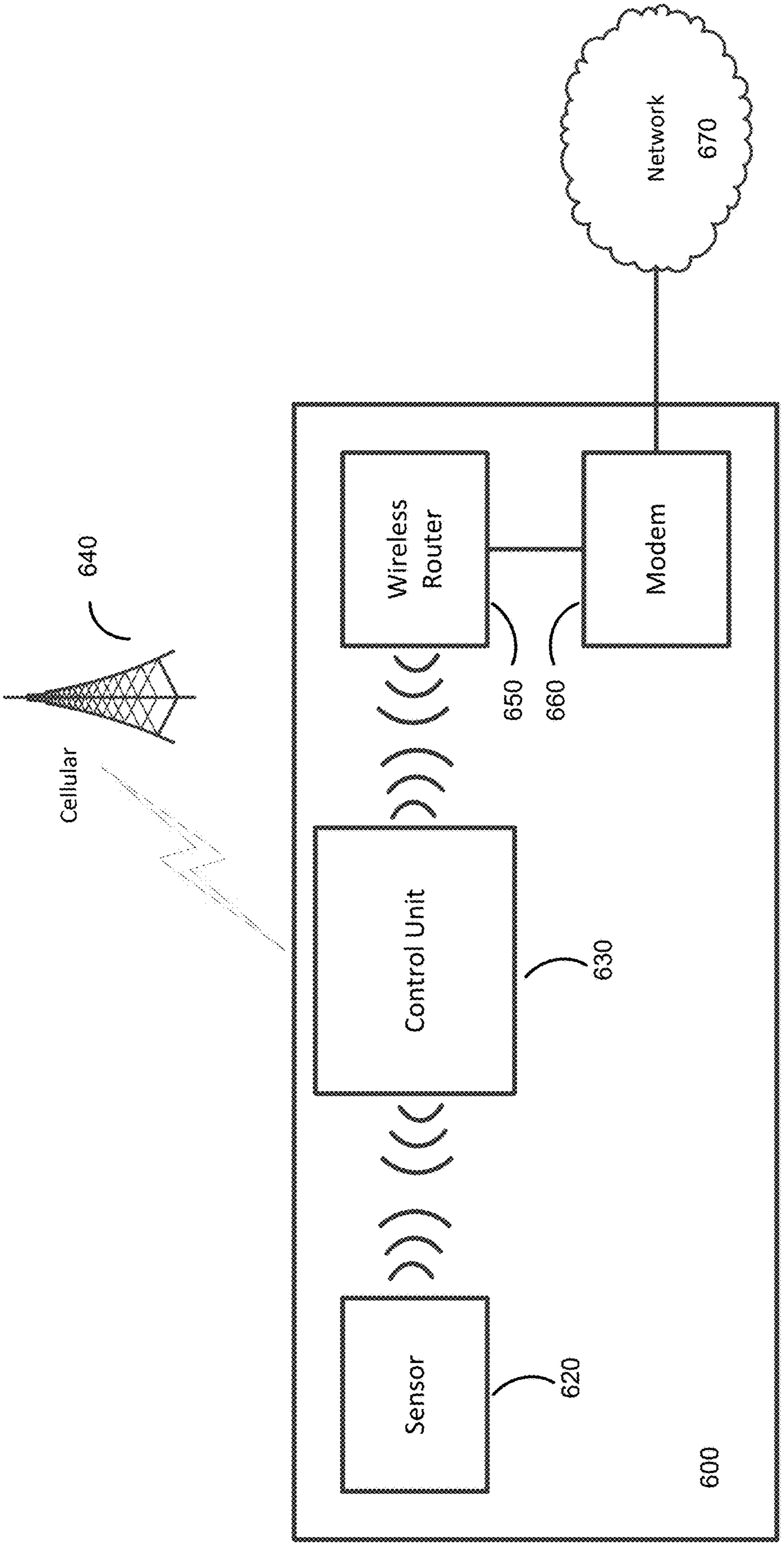
FIG. 6 shows a block diagram of an exemplary operating environment.

FIG. 6 shows a block diagram of a security system 600 that may be used to implement security system 600 policies. A sensor 620 (e.g., device 100, three-way switch 206,306, 308,410, etc.) may be located at an entry point barrier (e.g., entry point barrier 202,302,402) and in communication with a control unit 630 and/or to wireless router 600. Though depicted as a single block, the sensor 620 may actually be one, two, or several sensors at an entry point. The control unit 630 may be used to configure and control associated security devices (e.g., alarms, speakers, dial-out lines, message notifications, etc.) and/or monitoring devices (e.g., motion sensor, entry point sensor, surveillance camera, etc.), either directly (e.g., wired or wireless) or by providing a gateway to a network 670 via a communication element (e.g., network card, cellular transceiver, etc.) in communication with a wireless router 650. The control unit 630 may be configured to disable/deactivate security system policies (e.g., alarms, notifications, etc.) that are triggered/activated by the security devices and/or monitoring devices. The control unit 630 may disable/deactivate a security system policy in response to receiving a disable command, such as a code, token, biometric, etc., associated with an authorized user of the control unit 630. The control unit 630 may disable/deactivate a security system policy in response to receiving an indication that an entry point barrier is in a closed position (e.g., a window, door, gate, etc.). The control unit 630 may disable/deactivate a security system policy in response to receiving a disable command, such as a code, token, biometric, etc., associated with an authorized user of the control unit 630 as well as an indication that an entry point barrier is in a closed position.

Communication between the control unit 630 and the security devices and/or monitoring devices may be provided by coupling the control unit 630 (e.g., wired or wireless) with the wireless router 650, which in turn may be in communication with the network 670, such as a provider network or the Internet, via the modem 660. It is to be understood that the wireless router 650 and the modem 660 may be separate devices or they may be a single device. The wireless router 650 may be in communication with the network 670 through cable broadband, DSL, and the like. The network 670 may be in communication with a control server via an appropriate series of routers and firewalls (not shown). The control unit 630 may have additional mechanisms to provide communication with the control server, such as a cellular network transceiver that permits communication with a cellular network 640. The cellular network 640 may provide access via routers and firewalls to the control server. Additionally, the control unit 630 may provide gateway functionality via cellular and dwelling-based routers and modems, such as WiMAX, satellite-based broadband, direct telephone coupling, and the like.

In order to communicate with the sensor 620 and other security devices that are part of the security system 600, the control unit 630 may be in communication with one or more transceiver modules. The one or more transceiver modules may permit communication with the sensor 620 and the other security devices using a variety of protocols in a configurable manner, such as ZigBee, Z-Wave, Bluetooth™, WiFi, RFID, and the like. Other protocols may be provided for via one or more plug-in modules such as digital enhanced cordless telecommunication devices (DECT) and the like. In this way, the control unit 630 may be configured to provide for control of a variety of sensors 620 and other security devices using protocols known today and in the future.

The control unit 630 may be further configured to interpret indications received from the sensor 620. Interpreting a received indication(s) may include triggering one or more policies associated with the security system 600 (hereinafter, "security system policies), based on the type of indication(s) received. The security system policies may be pre-configured (e.g., by a technician or pre-loaded software) and/or user-defined (e.g., with a user device and device application). The security system policies may be stored on a memory of the control unit 630 and/or stored at the control server in communication with the control unit 630 via the network 670.

When the control unit 630 determines, based on an indication received from the sensor 620, that the entry point barrier is in a closed position, a first plurality of security system policies may be triggered. The first plurality of security system policies may include one or more of: causing a notification indicating that the entry point barrier is closed to be provided to a user device; causing a sound, such as beep, chime, bell, etc., to be emitted at one or more of the user device, a security system panel, or the like; causing an alarm to sound if the control unit 630 subsequently determines the entry point barrier has moved into a fully opened position; causing a surveillance camera having a frame of view encompassing a full, or partial, view of the entry point barrier to begin, or to cease, recording; setting a status of the security system 600 to a ready-to-arm status; and the like.

When the control unit 630 determines, based on an indication received from the sensor 620, that the entry point barrier is in an ajar position, a second plurality of security system policies may be triggered and a fault associated with the entry point barrier may be determined to be present. The second plurality of security system policies may include one or more of: causing a notification indicating that the entry point barrier is ajar to be provided to a user device; causing a sound, such as beep, chime, bell, etc., to be emitted at one or more of the user device, a security system panel, or the like; causing an audible alert to be output by a speaker in communication with the security system 600; causing a surveillance camera having a frame of view encompassing a full, or partial, view of the entry point barrier to begin, or to cease, recording; setting a status of the security system 600 to a ready-to-arm-with-exception status (e.g., a fault is present and would need to be bypassed to arm); and the like.

The control unit 630 may determine, based on an indication received from the sensor 620 that the entry point barrier is in a closed position, a second plurality of security system policies may be triggered, and an additional fault associated with the entry point barrier may be determined to be present. The third plurality of security system policies may include one or more of: causing a notification indicating that the entry point barrier is fully open to be provided to a user device; causing a sound, such as beep, chime, bell, etc., to be emitted at one or more of the user device, a security system panel, or the like; causing an audible alert/alarm to be output by a speaker in communication with the security system; causing a surveillance camera having a frame of view encompassing a full, or partial, view of the entry point barrier to begin recording; setting a status of the security system to a not-ready-to-arm (e.g., a fault associated with an entry point barrier that cannot be bypassed is present); causing the control unit 630 to notify law enforcement (e.g., by communicating with law enforcement via WiFi, cellular, and/or telephone); and the like.

Figure 7:
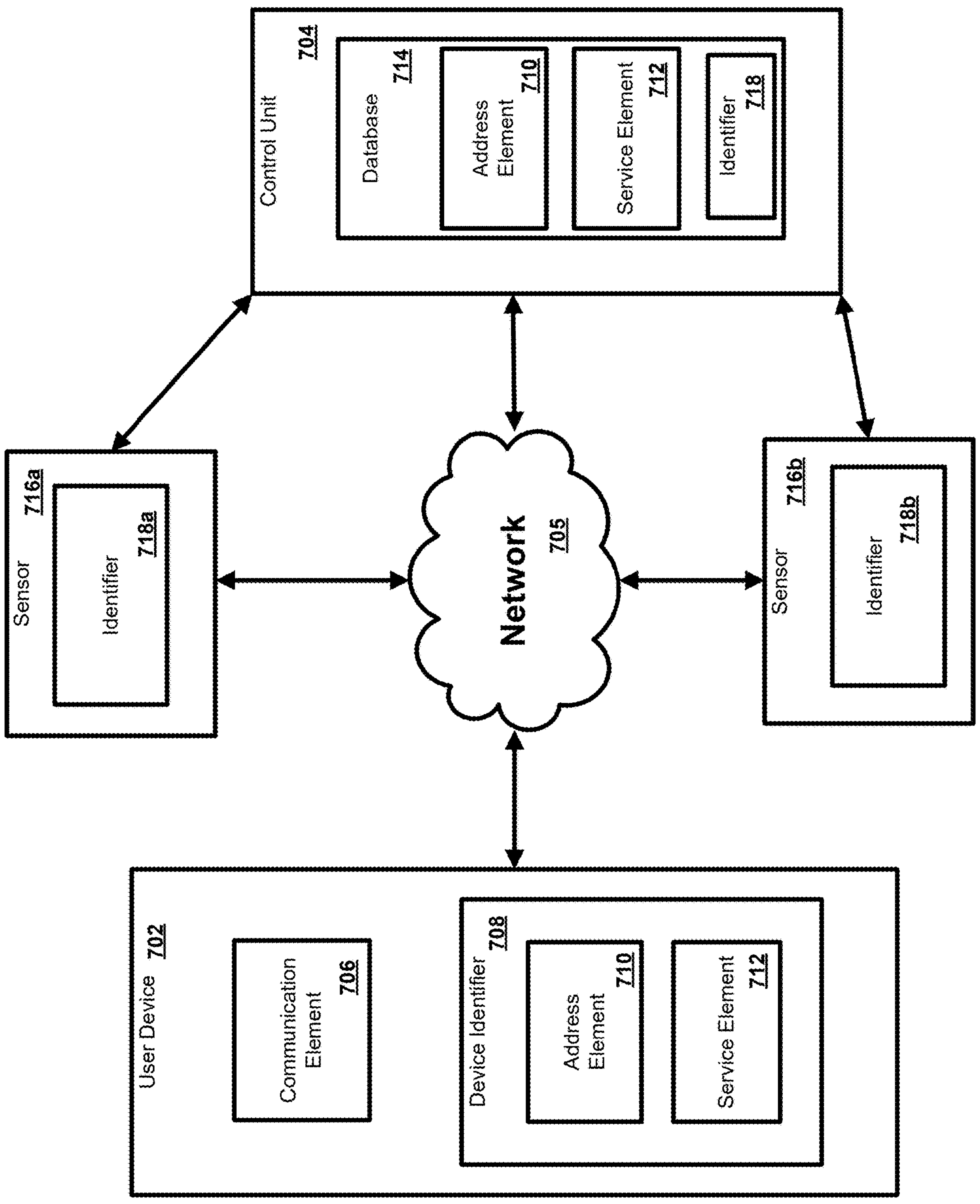
FIG. 7 shows a block diagram of an exemplary operating environment.

The above description of the security system 600, as well as the depiction of the security system 600 in FIG. 7, is only one of many possible configurations. As noted above, the wireless router 600 and the modem 660 may be a single device or separate devices. Further, the control unit 630 may be a single device or it may be a system of several devices (e.g., a programmable logic unit in communication with a human/machine interface, etc.). Additional configurations of the security system 600, while not explicitly described herein, may be operable with the present security system sensors and methods, as may be appreciated by one skilled in the art.

FIG. 7 illustrates various aspects of an environment in which the present security system sensors and methods may operate. The security system sensors and methods described herein are relevant to implementing policies for a security system via a user device 702 (e.g., via the control unit 630 of the security system 600). One or more sensors 716 (e.g., device 100, three-way switch 206,306,308,410, etc.) may be configured to provide an indication to a control unit 704 of a status of an entry point barrier (e.g., entry point barrier 202,302,402) at which the one or more sensors 716 are located. Those skilled in the art will appreciate that present methods may be used in various types of networks and systems that employ both digital and analog equipment. One skilled in the art will appreciate that provided herein is a functional description and that the respective functions may be performed by software, hardware, or a combination of software and hardware.

The networks and systems may comprise a user device 702 in communication with a control unit 704, such as a mobile device, computer, tablet, etc. The control unit 704 may be disposed locally or remotely relative to the user device 702. As an example, the user device 702 and the control unit 704 may be in communication via a private and/or public network 705 such as the Internet or a local area network. Other forms of communication may be used such as wired and/or wireless telecommunication channels, for example.

The user device 702 may be an electronic device such as a computer, a smartphone, a laptop, a tablet, a set-top box, a display device, a presentation device, a media device, or other device capable of communicating with the control unit 704. The user device 702 may have a communication element 706 for providing an interface to a user to interact with the user device 702 and/or the sensors 716. The communication element 706 may be any interface for presenting and/or receiving information to/from the user, such as user feedback. An example interface may be communication interface such as a web browser (e.g., Internet Explorer, Mozilla Firefox, Google Chrome, Safari, or the like) or a locally executing application (e.g., installed on a memory of the user device 702). Other software, hardware, and/or interfaces may be used to provide communication between a user and one or more of the user device 702 and the control unit 704. As an example, the communication element 706 may request or query various files from a local source and/or a remote source (e.g., a control server in communication with the control unit 704 via the network 705). As a further example, the communication element 706 may transmit data to a local or remote device such as the control unit 704 (e.g., queries and/or customizations relating to one or more security system policies).

A device identifier 708 of the user device 702 may have an address element 710 and a service element 712. The address element 710 may have or provide an internet protocol address, a network address, a media access control (MAC) address, an Internet address, or the like. As an example, the address element 710 may be relied upon to establish a communication session between the user device 702 and the control unit 704 or other devices and/or networks (e.g., sensors 716, network 705, a control server, etc.). As a further example, the address element 710 may be used as an identifier or locator of the user device 702.

The service element 712 may be an identification of a service provider and/or manufacturer associated with the user device 702 and/or with the class of user device 702. The class of the user device 702 may be related to a type of device, capability of device, type of service being provided, and/or a level of service (e.g., business class, service tier, service package, etc.). As an example, the service element 712 may identify information relating to or provided by a communication service provider (e.g., Internet service provider) that is providing or enabling data flow such as communication services to the user device 702. The address element 710 may be used to identify or retrieve data from the service element 712, or vice versa. As a further example, one or more of the address element 710 and the service element 712 may be stored remotely from the user device 702 and retrieved by one or more devices such as the user device 702 and the control unit 704. Other information may be represented by the service element 712 as well.

The control unit 704 may be an electronic device (e.g., programmable logic unit with a human/machine interface, a computer, a tablet, etc.) for communicating with the user device 702. As an example, the control unit 704 may communicate with the sensors 716 and the user device 702 when implementing security system policies. The control unit 704 may provide services such as network (e.g., Internet) connectivity, network printing, media management (e.g., media server), content services, streaming services, broadband services, or other network-related services to the sensors 716 as well as other security devices that are part of the security system (e.g., cameras, alarms, speakers, etc.). The control unit 704 may allow the user device 702 to interact with remote resources such as data, devices, and files (e.g., security system policy parameters).

The control unit 704 may manage communication between the user device 702 and a database 714 for sending and receiving data therebetween. The database 714 may store a plurality of files (e.g., security system policies), logs, records, or other information. The user device 702 may request and/or retrieve a file from the database 714. The database 714 may store information relating to the user device 702 such as the address element 810 and/or the service element 712. The control unit 704 may obtain the user device identifier 708 from the user device 702 and retrieve information from the database 714 such as the address element 710 and/or the service elements 712. The control unit 704 may obtain the address element 710 from the user device 702 and may retrieve the service element 712 from the database 714, or vice versa. Any information may be stored in and retrieved from the database 714. The database 714 may be disposed remotely from the control unit 704 and accessed via direct or indirect connection. The database 714 may be integrated with the control unit 704 or some other device or system.

One or more security system devices such as sensors 716 may be in communication with a network such as network 705 and/or in communication directly with the control unit 704. The sensors 716 may be configured to connect to a wired and/or wireless network using Wi-Fi, Bluetooth, BLE, NFC, IrDA, ANT, ZigBee, Z-Wave, ultrasound, or any desired method or standard.

The sensors 716 may each have an identifier 718. As an example, one or more identifiers 718 may be or relate to an Internet Protocol (IP) Address IPV4/IPV6 or a media access control address (MAC address) or the like. As a further example, one or more identifiers 718 may be a unique identifier for facilitating communications on a physical network segment (e.g., between the sensors 716 and the control unit 702 or the network 705). Each of the sensors 716 may have a distinct identifier 718. As an example, the identifiers 718 may be associated with respective physical locations of the sensors 716.

One or more of the sensors 716 may be in communication with the control unit 704. The sensors 716 may be in communication with the network 705. The sensors 716 may have a low energy transmission device, such as a Bluetooth® Low Energy (BLE) device. BLE is a protocol that allows for long-term operation of Bluetooth® devices in low-volume data transmission. BLE may enable smaller form factors, better power optimization, and power cells that last for years on a single charge. BLE may function by transmitting brief bursts of low-bitrate data. BLE devices may operate for significantly longer periods of time with the same total power usage by drastically reducing the time spent at peak power consumption. Communication between the sensors 716 and the control unit 704 described herein may be accomplished using the BLE protocol. The sensors 716 may be configured with other low energy protocols such as near field communication (NFC), infrared data association (IrDA), ANT, ZigBee, Z-wave, ultrasound, and the like. A low energy device may be characterized as using less than about 200 microwatts per bit of data transmission, having a maximum current draw of less than about 50 milliamps, and/or less than about 0.2 milliwatts of power usage. Other low energy devices are specifically contemplated.

The sensors 716 may be configured as a peripheral device. For example, the sensors 716 may be configured as a beacon where the sensors 716 transmits packets that include an identifier 718 (e.g., a sensor identifier) and a status of an associated entry point (e.g., whether circuits associated with the sensors 716 are closed or open). The sensors 716 may be configured as a BLE and/or a ZigBee beacon. The sensors 716 may broadcast the identifier 718 which may be a universal unique identifier (UUID). The control unit 704 may be configured as a central device that monitors for one or more sensor identifiers. If the identifier 718 is an identifier for which the control unit 704 monitors and the control unit 704 detects the identifier 718, then the control unit 704 may perform an action based on the identifier 718 the control unit 704 detected (e.g., trigger one or more security system policies) and the indication(s) received. The control unit 704 may be monitoring for the identifier 718 based on an application installed on the control unit 704. As an example, the action may be to establish a communication session between the sensors 716 and the control unit 704 (e.g., when initially connecting a sensor 716 to the security system). As another example, the action may be performed at the control unit 704 such as triggering a security system policy and/or performing a function (e.g., cause an alarm to be triggered, contact law enforcement, etc.).

Figure 8:
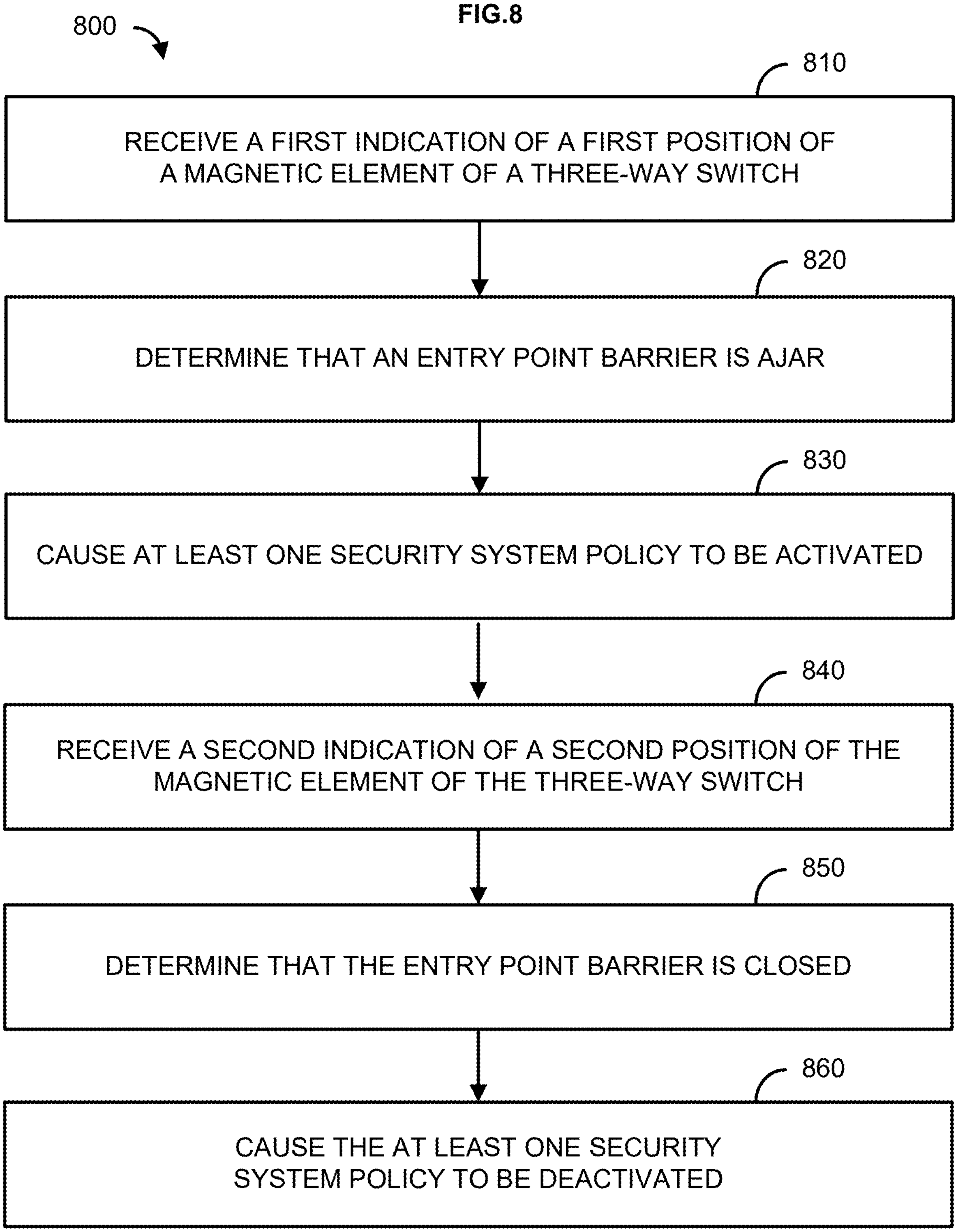
FIG. 8 shows a flowchart of an example method.

FIG. 8 shows a flowchart of a method 800 that may be used to implement policies for a security system (hereinafter, "security system policies). At step 810, a first indication of a first position of a magnetic element (e.g., longitudinal member 110) of a three-way switch (e.g., device 100)

associated with an entry point barrier (e.g., entry point barrier 202,302,402) may be received. The first indication may be indicative of the magnetic element of the three-way switch being in a neutral position. The first indication may be received by a control unit (e.g., control unit 630,704) that implements security system policies. The entry point barrier (e.g., a window, a door, a gate, etc.) may be situated within an entry point barrier frame 204 (e.g., entry point barrier frame 204,304,404). The three-way switch may be affixed to a planar surface of the entry point barrier, and two external objects (e.g., external objects 208,210) may each be affixed to a planar surface of the entry point barrier frame at respective positions along a direction of travel of the entry point barrier. The external objects may each have a bar magnet with opposite polarities. The magnetic element (e.g., longitudinal member 110) may be caused to move along a path of travel parallel to a top and a bottom of the three-way switch when a proximate external object acts upon the magnetic element (e.g., an external object attracts or repels the magnetic element). When the entry point barrier is at the neutral point along the path of travel within the entry point barrier frame, the magnetic element of the three-way switch may be sufficiently far from each external object such that neither is acting upon the magnetic element with sufficient force as to cause the magnetic element to be attracted to, or repelled by, either external object. The external objects may an electronic devices, such as Bluetooth™ sensors, RFID sensors, or the like. The external objects may detect a presence of the three-way switch and/or the magnetic element when they come into proximity.

When the entry point barrier is at an ajar position, both external objects may indicate to the security system that the three-way switch is not proximate (e.g., not detected). The three-way switch may have a circuit associated with a conductive interface affixed to a first side of the three-way switch (e.g., a side of the three-way switch adjacent to the external objects) as well as a circuit associated with a conductive interface affixed to a opposite side of the three-way switch, and the magnetic element may be disposed within the three-way switch between the first side and the opposite side. The magnetic element may be in the neutral position when the entry point barrier is at a point along the path of travel such that neither external object is acting upon, or detecting, the magnetic element. The magnetic element may be in the neutral position when it is not in contact with either conductive interface of the three-way switch.

At step 820, it may be determined (e.g., by the control unit 630 based on a the first indication received from the device 100) that the entry point barrier is in the ajar position. The determination may be based on the first indication. Specifically, the first indication may indicate that the circuit associated with the conductive interface affixed to the first side of the three-way switch is open and the circuit associated with the conductive interface affixed to the opposite side of the three-way switch is also open (e.g., the magnetic element of the three-way switch is not in contact with either conductive interface). The ajar position may correspond to a point along the entry point barrier's path of travel at which a secondary entry point lock (e.g., entry point barrier lock 205,305,405) is located. At step 830, based on (e.g., in response to) determining that the entry point barrier is in the ajar position, the security system (e.g., by the control unit 630) may cause at least one security system policy to be triggered (e.g., activated). The at least one security system policy may include one or more of: causing a notification indicating that the entry point barrier is ajar to be provided to a user device; causing a sound, such as beep, chime, bell, etc., to be emitted at one or more of the user device, a security system panel, or the like; causing an audible alert to be output by a speaker in communication with the security system; causing a surveillance camera having a frame of view encompassing a full, or partial, view of the entry point barrier to begin, or to cease, recording; setting a status of the security system to a ready-to-arm-with-exception status (e.g., a fault is present and would need to be bypassed to arm); and the like.

At step 840, a second indication may be received (e.g., by the three-way switch 100). The second indication may indicate that the magnetic element is in contact with the first conductive point (e.g., first conductive interface 114) of the three-way switch (e.g., the conductive interface affixed to the opposite side of the three-way switch 100). The magnetic element may be caused to come into contact with the first conductive point when the entry point barrier is at a closed position along the path of travel at which the magnetic element is proximate to the an external object closest to the start of the path of travel in the closing direction.

At step 850, it may be determined (e.g., by the control unit 630 based on the second indication received from the device 100) that the entry point barrier is closed (e.g., the entry point barrier is at a point along the path of travel that is prior to the entry point barrier lock). The determination that the entry point barrier is closed may be based on the second indication indicating that the magnetic element is in contact with the first conductive point (e.g., a circuit associated with the first conductive point is closed). As the entry point barrier moves into the closed position, the magnetic element of the three-way switch may come into proximity with the external object closest to the start of the path of travel. As described earlier, the external objects may each include a bar magnet, and the external object closest to the start of the path of travel may have a polarity that is opposite of the magnetic element's polarity. The bar magnet may act upon the magnetic element and cause it to be attracted to the bar magnet and to move along the path of travel within the three-way switch until it comes into contact with the first conductive point. The external object closest to the start of the path of travel may detect a presence of the three-way switch and/or the magnetic element when it comes into proximity (e.g., via Bluetooth™, RFID, or the like). The security system may therefore determine (e.g., by the control unit 630) that the entry point barrier is in the closed position based on the external object closest to the start of the path of travel indicating that the three-way switch and/or the magnetic element is proximate to it.

At step 860, based on (e.g., in response to) determining that the entry point barrier is in the closed position, the security system (e.g., by the control unit 630) may cause the at least one security system policy to be deactivated. The at least one security system policy may be caused to be deactivated in response to the security system receiving a command from a user device and/or a control panel in communication with the security system. The command may be a security system code, a user biometric, a token, or the like.

A third indication may be received (e.g., by the three-way switch 100) indicating that the magnetic element is in contact with a second conductive point (e.g., second conductive interface 116) of the three-way switch (e.g., the conductive interface affixed to the opposite side of the three-way switch 100). The magnetic element may be caused to come into contact with the second conductive point when the entry point barrier is at an open position along the path of travel at which the magnetic element is proximate to an external object furthest from the start of the path of travel in an opening direction.

Based on the third indication, it may be determined (e.g., by the control unit 630 based on the second indication received from the device 100) that the entry point barrier is in the open position and a fault is present in a security system zone associated with the entry point barrier. The determination that the entry point barrier is open may be based on the indication received from the three-way switch that the magnetic element is in contact with the second conductive point (e.g., a circuit associated with the second conductive point is closed). As the entry point barrier moves into the open position, the magnetic element of the three-way switch may come into proximity with the external object furthest along the path of travel. As described earlier, the external objects may each include a bar magnet, and the external object further along the path of travel may have a polarity that is the same as the magnetic element's polarity. The bar magnet may act upon the magnetic element and cause it to be repelled and to move along the path of travel within the three-way switch until it comes into contact with the second conductive point.

The external object furthest along the path of travel may detect a presence of the three-way switch and/or the magnetic element when it comes into proximity (e.g., via Bluetooth™, RFID, or the like). The security system may therefore determine that the entry point barrier is in the open position based on the external object further along the path of travel indicating that the three-way switch and/or the magnetic element is proximate to it.

Based on (e.g., in response to) determining that the entry point barrier is in the open position, the security system (e.g., by the control unit 630) may cause at least one further security system policy to be triggered (e.g., activated). The at least one further security system policy may include one or more of: causing a notification indicating that the entry point barrier is fully open to be provided to a user device; causing a sound, such as beep, chime, bell, etc., to be emitted at one or more of the user device, a security system panel, or the like; causing an audible alert/alarm to be output by a speaker in communication with the security system; causing a surveillance camera having a frame of view encompassing a full, or partial, view of the entry point barrier to begin recording; setting a status of the security system to a not-ready-to-arm (e.g., a fault associated with an entry point barrier that cannot be bypassed is present); causing the security system (e.g., via a control unit) to notify law enforcement (e.g., by communicating with law enforcement via WiFi, cellular, and/or telephone); and the like.

Figure 9:
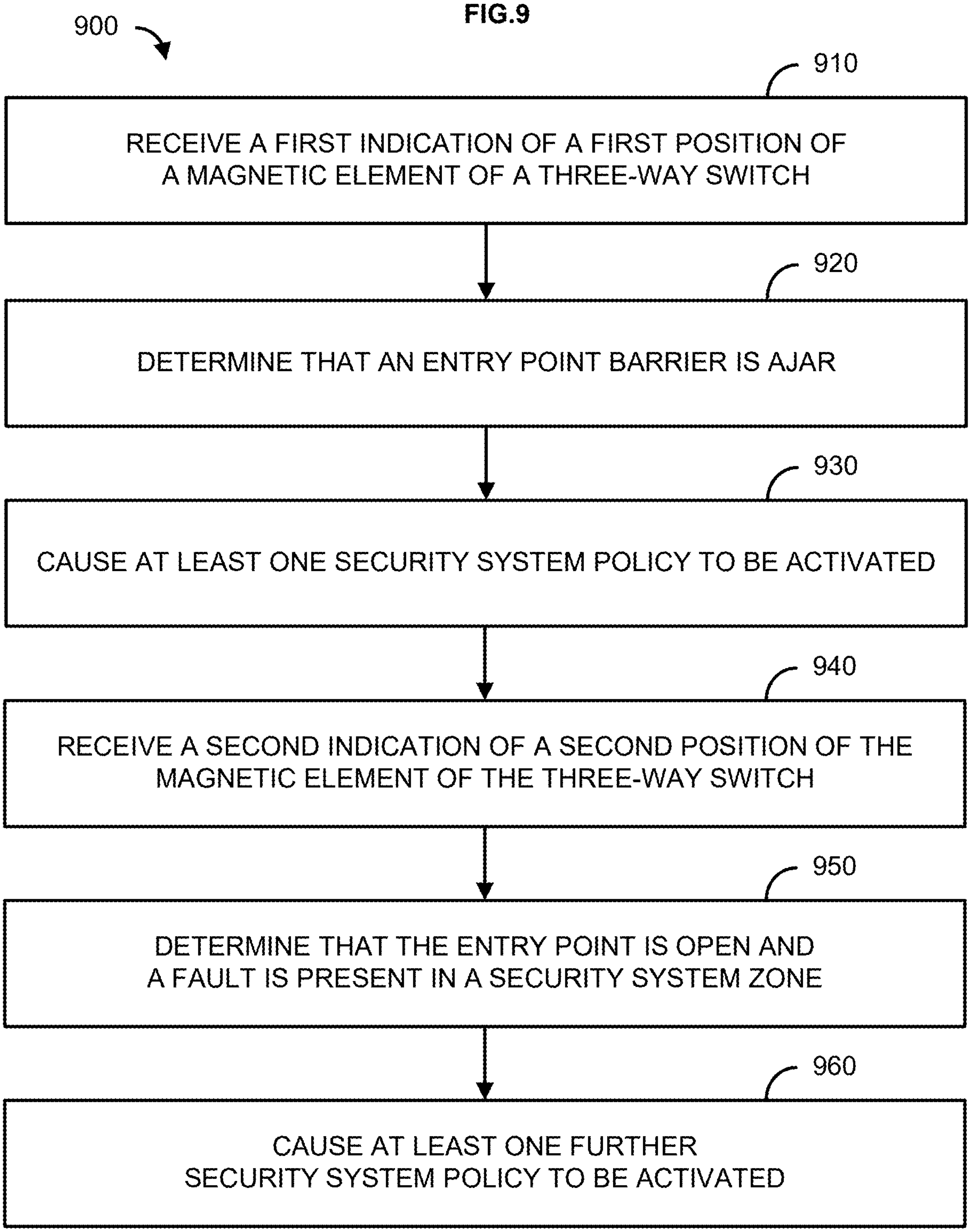
FIG. 9 shows a flowchart of an example method.

FIG. 9 shows a flowchart of a method 900 that may be used to implement policies for a security system (hereinafter, "security system policies). At step 910, a first indication of a first position of a magnetic element (e.g., longitudinal member 110) of a three-way switch (e.g., device 100) associated with an entry point barrier (e.g., entry point barrier 202,302,402) may be received. The first indication may be indicative of the magnetic element of the three-way switch being in a neutral position. The first indication may be received by a control unit (e.g., control unit 630,704) that implements security system policies. The entry point barrier (e.g., a window, a door, a gate, etc.) may be situated within an entry point barrier frame 204 (e.g., entry point barrier frame 204,304,404). The three-way switch may be affixed to a planar surface of the entry point barrier, and two external objects (e.g., external objects 208,210) may each be affixed to a planar surface of the entry point barrier frame at respective positions along a direction of travel of the entry point barrier. The external objects may each have a bar magnet with opposite polarities. The magnetic element (e.g., longitudinal member 110) may be caused to move along a path of travel parallel to a top and a bottom of the three-way switch when a proximate external object acts upon the magnetic element (e.g., an external object attracts or repels the magnetic element). When the entry point barrier is at the neutral point along the path of travel within the entry point barrier frame, the magnetic element of the three-way switch may be sufficiently far from each external object such that neither is acting upon the magnetic element with sufficient force as to cause the magnetic element to be attracted to, or repelled by, either external object. The external objects may an electronic devices, such as Bluetooth™ sensors, RFID sensors, or the like. The external objects may detect a presence of the three-way switch and/or the magnetic element when they come into proximity.

When the entry point barrier is at an ajar position, both external objects may indicate to the security system that the three-way switch is not proximate (e.g., not detected). The three-way switch may have a circuit associated with a conductive interface affixed to a first side of the three-way switch (e.g., a side of the three-way switch adjacent to the external objects) as well as a circuit associated with a conductive interface affixed to an opposite side of the three-way switch, and the magnetic element may be disposed within the three-way switch between the first side and the opposite side. The magnetic element may be in the neutral position when the entry point barrier is at a point along the path of travel such that neither external object is acting upon, or detecting, the magnetic element. The magnetic element may be in the neutral position when it is not in contact with either conductive interface of the three-way switch.

At step 920, it may be determined (e.g., by the control unit 630 based on the first indication received from the device 100) that the entry point barrier is in the ajar position. The determination may be based on the first indication. Specifically, the first indication may indicate that the circuit associated with the conductive interface affixed to the first side of the three-way switch is open and the circuit associated with the conductive interface affixed to the opposite side of the three-way switch is also open (e.g., the magnetic element of the three-way switch is not in contact with either conductive interface). The ajar position may correspond to a point along the entry point barrier's path of travel at which a secondary entry point lock (e.g., entry point barrier lock 205,305,405) is located.

At step 930, based on (e.g., in response to) determining that the entry point barrier is in the ajar position, the security system (e.g., by the control unit 630) may cause at least one security system policy to be triggered (e.g., activated). The at least one security system policy may include one or more of: causing a notification indicating that the entry point barrier is ajar to be provided to a user device; causing a sound, such as beep, chime, bell, etc., to be emitted at one or more of the user device, a security system panel, or the like; causing an audible alert to be output by a speaker in communication with the security system; causing a surveillance camera having a frame of view encompassing a full, or partial, view of the entry point barrier to begin, or to cease, recording; setting a status of the security system to a ready-to-arm-with-exception status (e.g., a fault is present and would need to be bypassed to arm); and the like.

At step 940, a second indication may be received (e.g., by the three-way switch 100) indicating that the magnetic element is in contact with a first conductive point (e.g., first conductive interface 114) of the three-way switch (e.g., the conductive interface affixed to the opposite side of the three-way switch 100). The magnetic element may be caused to come into contact with the first conductive point when the entry point barrier is at an open position along the path of travel at which the magnetic element is proximate to an external object furthest from the start of the path of travel in an opening direction.

At step 950, it may be determined (e.g., by the control unit 630 based on the second indication received from the device 100) that the entry point barrier is in the open position and a fault is present in a security system zone associated with the entry point barrier. The determination that the entry point barrier is open may be based on the indication received from the three-way switch that the magnetic element is in contact with the first conductive point (e.g., a circuit associated with the second conductive point is closed). As the entry point barrier moves into the open position, the magnetic element of the three-way switch may come into proximity with the external object furthest along the path of travel. As described earlier, the external objects may each include a bar magnet, and the external object further along the path of travel may have a polarity that is the same as the magnetic element's polarity. The bar magnet may act upon the magnetic element and cause it to be repelled and to move along the path of travel within the three-way switch until it comes into contact with the first conductive point. The external object furthest along the path of travel may detect a presence of the three-way switch and/or the magnetic element when it comes into proximity (e.g., via Bluetooth™, RFID, or the like). The security system may therefore determine that the entry point barrier is in the open position based on the external object further along the path of travel indicating that the three-way switch and/or the magnetic element is proximate to it.

At step 960, based on (e.g., in response to) determining that the entry point barrier is in the open position, the security system (e.g., by the control unit 630) may cause at least one further security system policy to be triggered (e.g., activated). The at least one further security system policy may include one or more of: causing a notification indicating that the entry point barrier is fully open to be provided to a user device; causing a sound, such as beep, chime, bell, etc., to be emitted at one or more of the user device, a security system panel, or the like; causing an audible alert/alarm to be output by a speaker in communication with the security system; causing a surveillance camera having a frame of view encompassing a full, or partial, view of the entry point barrier to begin recording; setting a status of the security system to a not-ready-to-arm (e.g., a fault associated with an entry point barrier that cannot be bypassed is present); causing the security system (e.g., via a control unit) to notify law enforcement (e.g., by communicating with law enforcement via WiFi, cellular, and/or telephone); and the like.

A third indication may be received (e.g., by the three-way switch 100) indicating that the magnetic element is in contact with a second conductive point (e.g., second conductive interface 116) of the three-way switch (e.g., the conductive interface affixed to the opposite side of the three-way switch 100). The magnetic element may be caused to come into contact with the second conductive point when the entry point barrier is at a closed position along the path of travel at which the magnetic element is proximate to the an external object closest to the start of the path of travel in the closing direction.

Based on the third indication, it may be determined (e.g., by the control unit 630 based on the second indication received from the device 100) that the entry point barrier is closed (e.g., the entry point barrier is at a point along the path of travel that is prior to the entry point barrier lock). The determination that the entry point barrier is closed may be based on the third indication indicating that the magnetic element is in contact with the second conductive point (e.g., a circuit associated with the second conductive point is closed). As the entry point barrier moves into the closed position, the magnetic element of the three-way switch may come into proximity with the external object closest to the start of the path of travel. As described earlier, the external objects may each include a bar magnet, and the external object closest to the start of the path of travel may have a polarity that is opposite of the magnetic element's polarity. The bar magnet may act upon the magnetic element and cause it to be attracted to the bar magnet and to move along the path of travel within the three-way switch until it comes into contact with the second conductive point. The external object closest to the start of the path of travel may detect a presence of the three-way switch and/or the magnetic element when it comes into proximity (e.g., via Bluetooth™, RFID, or the like). The security system may therefore determine (e.g., by the control unit 630) that the entry point barrier is in the closed position based on the external object closest to the start of the path of travel indicating that the three-way switch and/or the magnetic element is proximate to it. Based on (e.g., in response to) determining that the entry point barrier is in the closed position, the security system (e.g., by the control unit 630) may cause the at least one security system policy to be deactivated. The at least one security system policy may be caused to be deactivated in response to the security system receiving a command from a user device and/or a control panel in communication with the security system. The command may be a security system code, a user biometric, a token, or the like.

Figure 10:
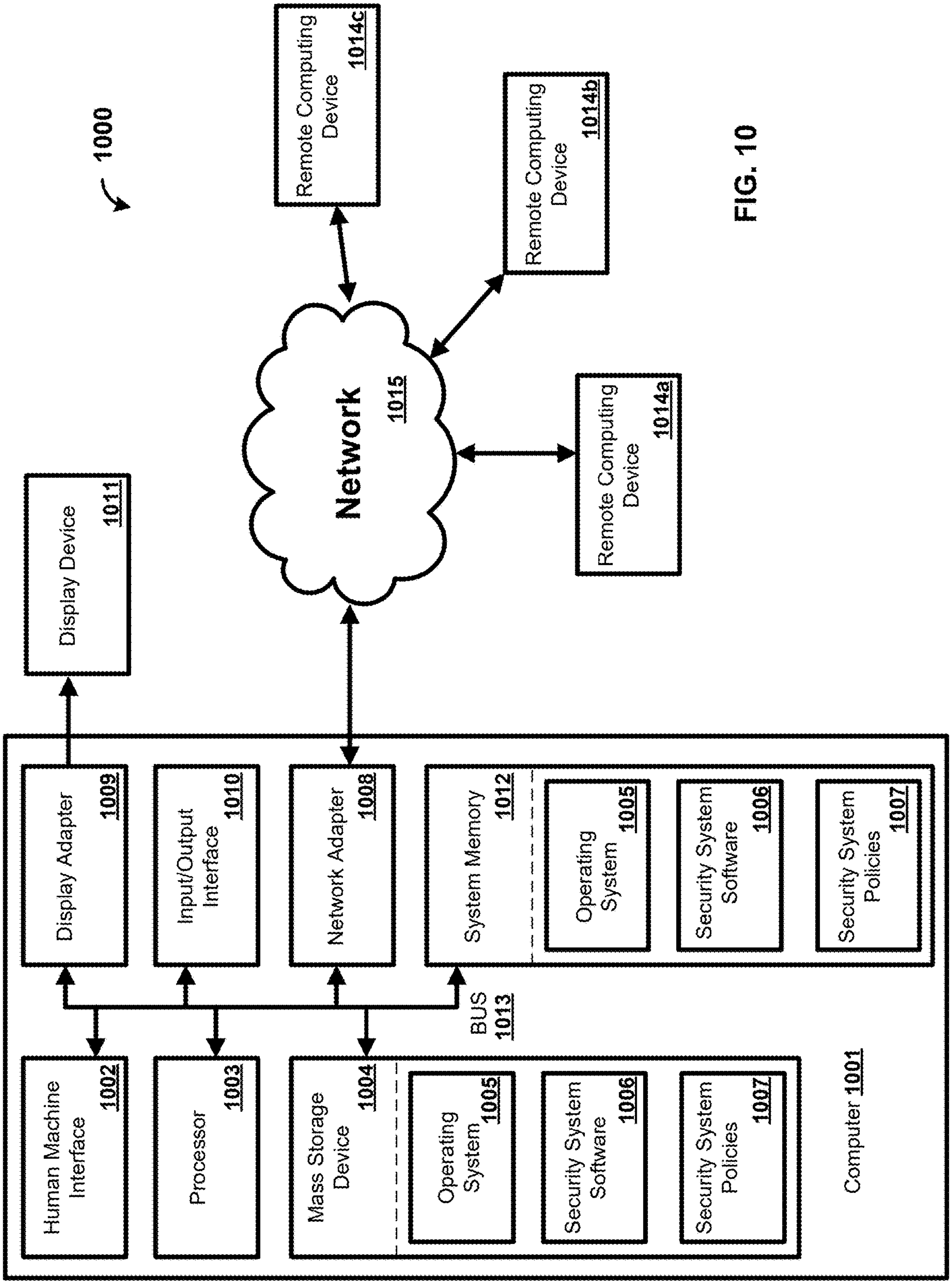
FIG. 10 shows a block diagram of an example computing device.

The methods described herein may be implemented on a computer 1001 as illustrated in FIG. 10 and described below. By way of example, the control unit 630 of FIG. 7 and the control unit 704 of FIG. 7 may each be a computer as illustrated in FIG. 10. Similarly, the methods described herein may utilize one or more computers to perform one or more functions in one or more locations. FIG. 10 is a block diagram illustrating an operating environment for performing the described methods. This operating environment is only an example of an operating environment and is not intended to suggest any limitation as to the scope of use or functionality of operating environment architecture. Neither should the operating environment be interpreted as having any dependency or requirement relating to any one or combination of components illustrated in the operating environment.

The present security system sensors and methods may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the described methods may be performed by software components. The described systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 1001. The components of the computer 1001 may comprise, but are not limited to, one or more processors or processing units 1003, a system memory 1012, and a system bus 1013 that couples various system components including the processing unit 1003 to the system memory 1012. In the case of multiple processing units 1003, the system may utilize parallel computing.

The system bus 1013 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB) and the like. The bus 1013, and all buses specified in this description may also be implemented over a wired or wireless network connection and each of the subsystems, including the processing unit 1003, a mass storage device 1004, an operating system 1005, security system software 1006, security system policies 1007, a network adapter 1008, system memory 1012, an Input/Output Interface 1010, a display adapter 1009, a display device 1011, and a human machine interface 1002, may be contained within one or more remote computing devices 1014*a,b,c* at physically separate locations, connected through buses of this form, in effect implementing a fully distributed system.

The computer 1001 typically comprises a variety of computer readable media. Exemplary readable media may be any available media that is accessible by the computer 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as security system policies 1007 and/or program modules such as operating system 1005 and security system software 1006 that are immediately accessible to and/or are presently operated on by the processing unit 1003.

In another aspect, the computer 1001 may also comprise other removable/non-removable, volatile/non-volatile computer storage media. By way of example, FIG. 10 illustrates a mass storage device 1004 which may provide non-volatile storage of computer code, computer readable instructions, data structures, program modules, and other data for the computer 1001. For example and not meant to be limiting, a mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1004, including by way of example, an operating system 1005 and security system software 1006. Each of the operating system 1005 and security system software 1006 (or some combination thereof) may comprise elements of the programming and the security system software 1006. Security system policies 1007 may also be stored on the mass storage device 1004. Security system policies 1007 may be stored in any of one or more databases known in the art. Examples of such databases comprise, DB2®, Microsoft® Access, Microsoft® SQL Server, Oracle®, mySQL, PostgreSQL, Mongo DB, Riak, HBase, Cassandra, and the like. The databases may be centralized or distributed across multiple systems.

In another aspect, the user may enter commands and information into the computer 1001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 1003 via a human machine interface 1002 that is in communication with the system bus 1013, but may be connected by other interface and bus structures, such as a parallel port, game port, an IEEE 1394 Port (also known as a Firewire port), a serial port, or a universal serial bus (USB).

In yet another aspect, a display device 1011 may also be connected to the system bus 1013 via an interface, such as a display adapter 1009. It is contemplated that the computer 1001 may have more than one display adapter 1009 and the computer 1001 may have more than one display device 1011. For example, a display device may be a monitor, an LCD (Liquid Crystal Display), or a projector. In addition to the display device 1011, other output peripheral devices may comprise components such as speakers (not shown) and a printer (not shown) which may be connected to the computer 1001 via Input/Output Interface 1010. Any step and/or result of the methods may be output in any form to an output device. Such output may be any form of visual representation, including, but not limited to, textual, graphical, animation, audio, tactile, and the like. The display 1011 and computer 1001 may be part of one device, or separate devices.

The computer 1001 may operate in a networked environment using logical connections to one or more remote computing devices 1014*a,b,c*. By way of example, a remote computing device may be a personal computer, portable computer, smartphone, a server, a router, a network computer, a peer device or other common network node, and so on. Logical connections between the computer 1001 and a remote computing device 1014*a,b,c* may be made via a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

For purposes of illustration, application programs and other executable program components such as the operating system 1005 are illustrated herein as discrete blocks, although it is recognized that such programs and components reside at various times in different storage components of the computer 1001, and are executed by the data processor(s) of the computer. An implementation of security system software 1006 may be stored on or transmitted across some form of computer readable media. Any of the described methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The present description is intended to provide those of ordinary skill in the art with a complete description of how the articles, devices and/or methods claimed herein are made and evaluated, and are intended to be purely exemplary and are not intended to limit the scope of the described security system sensors and methods. Efforts have been made to ensure accuracy with respect to numbers (e.g., time, amounts, etc.), but some errors and deviations should be accounted for.

The description of the present security system sensors and methods is not intended to limit their scope. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow or plain meaning derived from grammatical organization or punctuation.

It will be apparent to those skilled in the art that various modifications and variations may be made without departing from the scope or spirit. Other modifications and variations will be apparent to those skilled in the art from consideration of the specification and practice described herein. It is intended that the specification and descriptions therein be considered as exemplary only, with a true scope and spirit being indicated by the following claims.

The invention claimed is:

1. An apparatus, comprising:

one or more processors; and a memory storing processor-executable instructions, that when executed by the one or more processors, cause the apparatus to:

receive an indication that a portion of a three-way switch, located adjacent to at least one passive element configured to adjust the three-way switch and positioned on or adjacent to an entry point barrier, is in a first position;

cause, based on the indication that the portion of the three-way switch is in the first position, at least one security system policy to be activated;

receive an indication that the portion of the three-way switch is in a second position; and cause, based on the indication that the portion of the three-way switch is in the second position, the at least one security system policy to be deactivated.

2. The apparatus of claim 1, wherein the processor-executable instructions, when executed by the one or more processors, further cause the apparatus to:

determine, based on the indication that the portion of the three-way switch is in the first position, that the entry point barrier is ajar, wherein the processor-executable instructions that, when executed by the one or more processors, cause the apparatus to cause, based on the indication that the portion of the three-way switch is in the first position, the at least one security system policy to be activated, cause the apparatus to cause, based on the determination that the entry point barrier is ajar, the at least one security system policy to be activated.

3. The apparatus of claim 1, wherein the processor-executable instructions, when executed by the one or more processors, further cause the apparatus to:

determine, based on the indication that the portion of the three-way switch is in the second position, that the entry point barrier is closed, wherein the processor-executable instructions that, when executed by the one or more processors, cause the apparatus to cause, based on the indication that the portion of the three-way switch is in the second position, the at least one security system policy to be deactivated, cause the apparatus to cause, based on the determination that the entry point barrier is closed, the at least one security system policy to be deactivated.

4. The apparatus of claim 1, wherein the at least one security system policy comprises at least one of causing a surveillance device to be activated, causing an alarm to be emitted at one or both of a user device or a control unit of a security system, causing a notification to be sent to one or both of the user device or the control unit of the security system, or causing a security system status to change.

5. The apparatus of claim 1, wherein the first position is a neutral position and wherein the second position comprises the portion of the three-way switch being in contact with a first conductive point of the three-way switch.

6. The apparatus of claim 1, wherein the processor-executable instructions, when executed by the one or more processors, further cause the apparatus to:

receive an indication that the portion of the three-way switch is in a third position;

determine, based on the indication that the portion of the three-way switch is in the third position, that the entry point barrier is open and a fault is present in a security system zone associated with the entry point barrier; and cause, based on the determination that the entry point barrier is open and the fault is present in the security system zone, at least one second security system policy to be activated.

7. The apparatus of claim 6, wherein the at least one second security system policy comprises at least one of causing an alarm to be activated or causing a security system status to change.

8. An apparatus, comprising:

one or more processors; and a memory storing processor-executable instructions, that when executed by the one or more processors, cause the apparatus to:

receive an indication that a portion of a three-way switch, located adjacent to at least one passive element configured to adjust the three-way switch and positioned on or adjacent to an entry point barrier, is in a first position;

determine, based on the indication that the portion of the three-way switch is in the first position, that the entry point barrier is ajar; and cause, based on the determination that the entry point barrier is ajar, at least one security system policy to be activated.

9. The apparatus of claim 8, wherein the processor-executable instructions, when executed by the one or more processors, further cause the apparatus to:

receive an indication that the portion of the three-way switch is in a second position; and cause, based on the indication that the portion of the three-way switch is in the second position, the at least one security system policy to be deactivated.

10. The apparatus of claim 9, wherein the processor-executable instructions, when executed by the one or more processors, further cause the apparatus to:

determine, based on the indication that the portion of the three-way switch is in the second position, that the entry point barrier is closed, wherein the processor-executable instructions that, when executed by the one or more processors, cause the apparatus to cause, based on the indication that the portion of the three-way switch is in the second position, the at least one security system policy to be deactivated, cause the apparatus to cause, based on the determination that the entry point barrier is closed, the at least one security system policy to be deactivated.

11. The apparatus of claim 8, wherein the at least one security system policy comprises at least one of causing a surveillance device to be activated, causing an alarm to be emitted at one or both of a user device or a control unit of a security system, causing a notification to be sent to one or both of the user device or the control unit of the security system, or causing a security system status to change.

12. The apparatus of claim 8, wherein the first position is a neutral position.

13. The apparatus of claim 8, wherein the processor-executable instructions, when executed by the one or more processors, further cause the apparatus to:

receive an indication that the portion of the three-way switch is in a second position;

determine, based on the indication that the portion of the three-way switch is in the second position, that the entry point barrier is open and a fault is present in a security system zone associated with the entry point barrier; and cause, based on the determination that the entry point barrier is open and the fault is present in the security system zone, at least one further security system policy to be activated.

14. An apparatus, comprising:

one or more processors; and a memory storing processor-executable instructions, that when executed by the one or more processors, cause the apparatus to:

receive an indication that a portion of a three-way switch is in a first position;

cause, based on the indication that the portion of the three-way switch is in the first position, at least one security system policy to be activated;

receive an indication that the portion of the three-way switch is in a second position; and cause, based on the indication that the portion of the three-way switch is in the second position, at least one second security system policy to be activated.

15. The apparatus of claim 14, wherein the processor-executable instructions, when executed by the one or more processors, further cause the apparatus to:

determine, based on the indication that the portion of the three-way switch is in the first position, that an entry point barrier is ajar, wherein the processor-executable instructions that, when executed by the one or more processors, cause the apparatus to cause, based on the indication that the portion of the three-way switch is in the first position, the at least one security system policy to be activated, cause the apparatus to cause, based on the determination that the entry point barrier is ajar, the at least one security system policy to be activated.

16. The apparatus of claim 14, wherein the processor-executable instructions, when executed by the one or more processors, further cause the apparatus to:

determine, based on the indication that the portion of the three-way switch is in the second position, that an entry point barrier is open, wherein the processor-executable instructions that, when executed by the one or more processors, cause the apparatus to cause, based on the indication that the portion of the three-way switch is in the second position, the at least one second security system policy to be activated, cause the apparatus to cause, based on the determination that the entry point barrier is open, the at least one second security system policy to be activated.

17. The apparatus of claim 14, wherein the at least one security system policy comprises at least one of causing a surveillance device to be activated, causing an alarm to be emitted at one or both of a user device or a control unit of a security system, causing a notification to be sent to one or both of the user device or the control unit of the security system, or causing a security system status to change, and wherein the at least one second security system policy comprises at least one of causing the alarm to be activated or causing the security system status to change.

18. A security system comprising:

a computing device configured to:

receive an indication that a portion of a three-way switch, located adjacent to at least one passive element configured to adjust the three-way switch and positioned on or adjacent to an entry point barrier, is in a first position;

cause, based on the indication that the portion of the three-way switch is in the first position, at least one security system policy to be activated;

receive an indication that the portion of the three-way switch is in a second position; and cause, based on the indication that the portion of the three-way switch is in the second position, the at least one security system policy to be deactivated; and the three-way switch configured to:

send the indication that the portion of the three way switch is in the first position; and send the indication that the portion of the three way switch is in the second position.

19. The system of claim 18, wherein the computing device is further configured to:

determine, based on the indication that the portion of the three-way switch is in the first position, that the entry point barrier is ajar, wherein to cause, based on the indication that the portion of the three-way switch is in the first position, the at least one security system policy to be activated, the computing device is configured to cause, based on the determination that the entry point barrier is ajar, the at least one security system policy to be activated.

20. The system of claim 18, wherein the computing device is further configured to:

determine, based on the indication that the portion of the three-way switch is in the second position, that the entry point barrier is closed, wherein to cause, based on the indication that the portion of the three-way switch is in the second position, the at least one security system policy to be deactivated, the computing device is configured to cause, based on the determination that the entry point barrier is closed, the at least one security system policy to be deactivated.

21. The system of claim 18, wherein the at least one security system policy comprises at least one of causing a surveillance device to be activated, causing an alarm to be emitted at one or both of a user device or a control unit of the security system, causing a notification to be sent to one or both of the user device or the control unit of the security system, or causing a security system status to change.

22. The system of claim 18, wherein the first position is a neutral position and wherein the second position comprises the portion of the three-way switch being in contact with a first conductive point of the three-way switch.

23. The system of claim 18, wherein the computing device is further configured to:

receive an indication that the portion of the three-way switch is in a third position;

determine, based on the indication that the portion of the three-way switch is in the third position, that the entry point barrier is open and a fault is present in a security system zone associated with the entry point barrier; and cause, based on the determination that the entry point barrier is open and the fault is present in the security system zone, at least one second security system policy to be activated.

24. The system of claim 23, wherein the at least one second security system policy comprises at least one of causing an alarm to be activated or causing a security system status to change.

25. A security system comprising:

a computing device configured to:

receive an indication that a portion of a three-way switch is in a first position;

cause, based on the indication that the portion of the three-way switch is in the first position, at least one security system policy to be activated;

receive an indication that the portion of the three-way switch is in a second position; and cause, based on the indication that the portion of the three-way switch is in the second position, at least one second security system policy to be activated; and the three-way switch configured to:

send the indication that the portion of the three way switch is in the first position; and send the indication that the portion of the three way switch is in the second position.

26. The system of claim 25, wherein the computing device is further configured to:

determine, based on the indication that the portion of the three-way switch is in the first position, that an entry point barrier is ajar, wherein to cause, based on the indication that the portion of the three-way switch is in the first position, the at least one security system policy to be activated, the computing device is configured to cause, based on the determination that the entry point barrier is ajar, the at least one security system policy to be activated.

27. The system of claim 25, wherein the computing device is further configured to:

determine, based on the indication that the portion of the three-way switch is in the second position, that an entry point barrier is open, wherein to cause, based on the indication that the portion of the three-way switch is in the second position, the at least one second security system policy to be activated, the computing device is configured to cause, based on the determination that the entry point barrier is open, the at least one second security system policy to be activated.

28. The system of claim 25, wherein the at least one security system policy comprises at least one of causing a surveillance device to be activated, causing an alarm to be emitted at one or both of a user device or a control unit of the security system, causing a notification to be sent to one or both of the user device or the control unit of the security system, or causing a security system status to change, and wherein the at least one second security system policy comprises at least one of causing the alarm to be activated or causing the security system status to change.

* * * * *